(12) United States Patent
Kubo et al.

(10) Patent No.: US 11,044,039 B2
(45) Date of Patent: Jun. 22, 2021

(54) BASE STATION, COMMUNICATION TERMINAL, AND WIRELESS COMMUNICATION METHOD

(71) Applicant: NEC CORPORATION, Tokyo (JP)

(72) Inventors: Shota Kubo, Tokyo (JP); Shizen Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 11 days.

(21) Appl. No.: 16/360,507

(22) Filed: Mar. 21, 2019

(65) Prior Publication Data
US 2019/0296854 A1  Sep. 26, 2019

(30) Foreign Application Priority Data
Mar. 23, 2018  (JP) .............................. JP2018-055849

(51) Int. Cl.
| | |
|---|---|
| *H04L 1/00* | (2006.01) |
| *H04L 5/00* | (2006.01) |
| *H04W 24/10* | (2009.01) |
| *H04W 72/04* | (2009.01) |
| *H04W 80/02* | (2009.01) |
| *H04W 76/11* | (2018.01) |
| *H04B 17/327* | (2015.01) |

(52) U.S. Cl.
CPC ......... *H04L 1/0026* (2013.01); *H04B 17/327* (2015.01); *H04L 5/0051* (2013.01); *H04W 24/10* (2013.01); *H04W 72/042* (2013.01); *H04W 72/046* (2013.01); *H04W 76/11* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 2016/0119101 | A1* | 4/2016 | Liu ....................... | H04W 24/10 370/280 |
| 2017/0366377 | A1* | 12/2017 | Papasakellariou ......................... | H04L 27/2613 |
| 2018/0167930 | A1* | 6/2018 | Huang ................. | H04B 7/0626 |
| 2018/0227030 | A1* | 8/2018 | Chen .................... | H04B 7/0626 |
| 2019/0296808 | A1* | 9/2019 | Kato .................... | H04W 16/28 |
| 2020/0154300 | A1* | 5/2020 | Song .................... | H04W 24/08 |

FOREIGN PATENT DOCUMENTS

JP  2013-527644 A  6/2013

OTHER PUBLICATIONS

"3rd Generation Partnership Project; Technical Specification Group Radio Access Network; NR; Physical channels and modulation (Release 15)", 3GPP TS 38.211 V15.0.0, Dec. 2017, pp. 1-73.

(Continued)

*Primary Examiner* — Saba Tsegaye

(57) ABSTRACT

A base station includes a transmission unit. The transmission unit transmits, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting.

7 Claims, 14 Drawing Sheets

(56) References Cited

OTHER PUBLICATIONS

"3rd Generation Partnership Project; Technical Specification Group Radio Access Network; NR; Physical layer procedures for data (Release 15)", 3GPP TS 38.214 V15.0.0, Dec. 2017, pp. 1-71.
"Views on common PDCCH", NTT Docomo, Inc., 3GPP TSG RAN WG1 Meeting #88, R1-1702807, pp. 1-5.
"Triggered UCI Transmissions", Samsung, 3GPP TSG RAN WG1 Meeting NR#3, R1-1716017, Sep. 18-25, 2017, pp. 1-3, Nagoya, Japan.

* cited by examiner

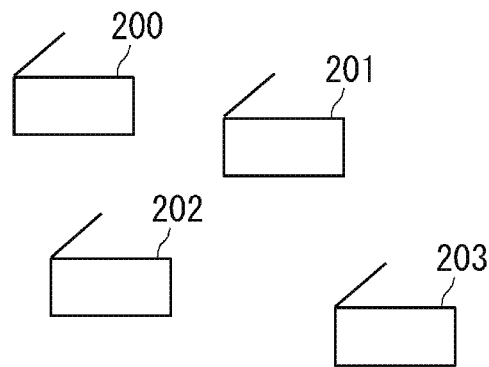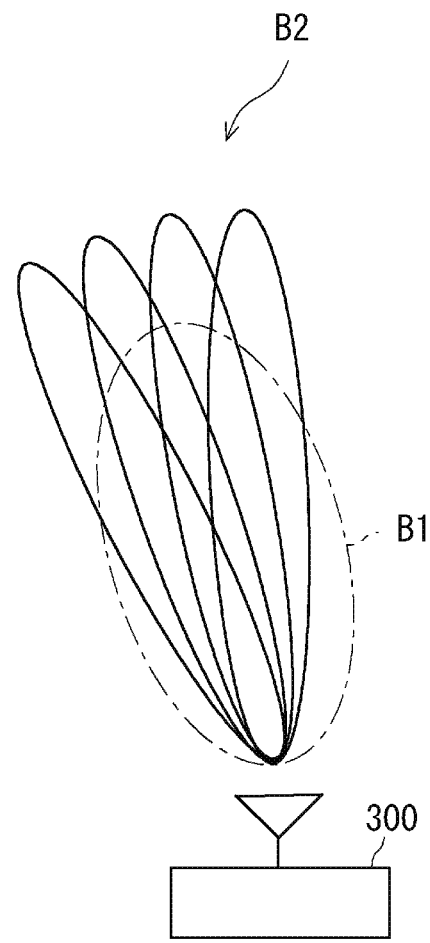
Fig. 5

BASE STATION, COMMUNICATION TERMINAL, AND WIRELESS COMMUNICATION METHOD

INCORPORATION BY REFERENCE

This application is based upon and claims the benefit of priority from Japanese patent application No. 2018-055849, filed on Mar. 23, 2018, the disclosure of which is incorporated herein in its entirety by reference.

TECHNICAL FIELD

The present disclosure relates to a base station, a communication terminal, and a wireless communication method.

BACKGROUND ART

Currently, 3GPP (3rd Generation Partnership Project) has been developing specifications of NR (New Radio), which is a fifth generation mobile communication system. In NR, it is assumed that beamforming is performed using a large number of antenna elements. Especially in the millimeter wave band in which a carrier frequency of several tens of GHz is used, beamforming can be powerful means for compensating a large propagation loss.

A maximum gain achieved by beamforming is increased by increasing directivity of a transmission beam. On the other hand, increased directivity of the transmission beam narrows a spatial range in which a gain higher than a certain value is achieved. For this reason, it is necessary for a base station to make a communication terminal precisely track the transmission beam directed to the communication terminal based on a spatial position of the communication terminal to thereby improve the directivity of the transmission beam. It is necessary to receive a measurement result report on the transmission beam in order for the base station to make the communication terminal precisely and accurately track the transmission beam directed to the communication terminal even when a propagation path is non-reciprocal in upstream and downstream or when an interference from other radio links is large.

The base station uses a plurality of transmission beams which cover a certain spatial range to transmit a plurality of reference signals (RSs) to the communication terminal present in the spatial range in order to receive the measurement result report on the transmission beam from the communication terminal. Then, the communication terminal measures RSRP (Reference Signal Received Power) of the plurality of RSs and transmits a Channel State Information (CSI) report including the measured RSRP to the base station.

The base station can determine the directivity of the transmission beam suitable for each communication terminal based on the received RSRP. Then, the base station transmits data to each communication terminal using the determined transmission beam.

It is necessary for the base station to transmit instruction information for making each of the plurality of communication terminals report the measurement result of the RSRP in order to achieve such processing. However, the greater the number of communication terminals, the more the amount of data of the instruction information transmitted by the base station becomes. That is, there is a problem in which an overhead of the control information increases in such a case.

Here, the technical specification of NR related to the above problem will be described with reference to Non Patent Literature 1 and 2. In NR, Synchronization Signal/Physical Broadcast Channel-block (SS/PBCH-block) or Channel State Information-Reference Signal (CSI-RS) is used as the RS for RSRP measurement.

An SS/PBCH-block is composed of four OFDM symbols and is transmitted at a cycle of 5, 10, 20, 40, 80, or 160 ms. The number of SS/PBCH-blocks that can be transmitted in each cycle is 8 when the carrier frequency is less than 6 GHz and 64 when the carrier frequency is 6 GHz or higher. Each SS/PBCH-block in the cycle is indexed in ascending order. When the carrier frequency is 6 GHz or higher, the range of this index is 0 to 63. Different transmission beams can be applied to SS/PBCH-blocks with different indices.

The CSI-RS is an RS to be measured when a communication terminal generates CSI (e.g., Patent Literature 1). In terms of periodicity, CSI-RS is classified into three types: periodic CSI-RS, semi-persistent CSI-RS, and aperiodic CSI-RS.

Among the three types of CSI-RS, the aperiodic CSI-RS has a feature that one CSI-RS transmission is performed by one transmission trigger. This transmission trigger is included in DCI (Downlink Control Information) transmitted on a downlink control channel PDCCH (Physical Downlink Control Channel). The aperiodic CSI-RS is transmitted in the same slot as the slot in which this DCI is transmitted or slot different from the slot in which the DCI is transmitted. The aperiodic CSI-RS and the aperiodic CSI reporting are triggered at the same time.

The combination of the aperiodic CSI-RS and the aperiodic CSI reporting is considered to be suitable for achieving precise beam tracking. Specifically, the above combination can be dynamically triggered by the DCI, which enables the base station to determine a transmission beam candidate according to a moving speed of the communication terminal, a geographical position, and reported information, and to instruct the communication terminal to measure the RSRP. In other words, since the base station can transmit the instruction information for the aperiodic CSI-RS and the aperiodic CSI reporting at a desired timing, it can instruct the communication terminal to measure the RSRP at a desired timing. Furthermore, the number of transmissions of the aperiodic CSI-RS is one, thereby shortening the time in which downlink radio resources are occupied by the CSI-RS.

Here, as described above, when the base station instructs each of a large number of communication terminals to measure the RSRP and report CSI, the overhead of the control information increases. To address this issue, related techniques for preventing an increase in the overhead of the control information while achieving precise beam tracking have been studied (Non Patent Literature 3 and 4).

Non Patent Literature 3 describes a notification about a transmission of the aperiodic CSI-RS using a downlink control channel common to a plurality of communication terminals. Non Patent Literature 4 describes that a plurality of communication terminals are instructed to perform aperiodic CSI reporting using a common downlink control channel. This effectively prevents an increase in the overhead of the control information.

Patent Literature 1: Domestic Re-publication of PCT International Publication for Patent Application, No. 2013-527644

Non Patent Literature 1: 3GPP, "3GPP TS38. 211 v15.0.0," December 2017.

Non Patent Literature 2: 3GPP, "3GPP TS38. 214 v15.0.0," December 2017.

Non Patent Literature 3: NTT DOCOMO, INC. "Views on common PDCCH", 3GPP TSG RAN WG1 Meeting #88. Athens, Greece, 13-17 Feb. 2017.

Non Patent Literature 4: Samsung "Triggered UCI Transmissions", 3GPP TSG RAN WG1 NR Ad-Hoc Meeting #3. Nagoya, Japan, 18-25 Sep. 2017. R1-1716017

However, the above Non Patent Literature 1 to 4 do not disclose specific means for instructing a plurality of communication terminals to perform aperiodic CSI reporting using a common downlink control channel.

Incidentally, in order to improve radio resource utilization efficiency, it is desirable that a plurality of communication terminals present at positions spatially close to each other are instructed to measure the RSRP about a common CSI-RS, so that downlink radio resources will not be consumed.

On the other hand, it is desirable that the communication terminals present at spatial positions which cannot be covered by transmission beams of the CSI-RS are not instructed to measure RSRP and perform CSI reporting. This is to reduce power consumption required for measuring the RSRP of the communication terminal and to prevent uplink radio resources from being wastefully consumed and further interfering with other radio links.

SUMMARY

One of the objects of the present disclosure is to solve the above problem, and to provide a base station, a communication terminal, and a wireless communication method capable of reducing unnecessary CSI reporting.

In order to solve the above problem, a base station according to the present disclosure includes:

a transmission unit configured to transmit, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting; and a reception unit configured to receive the CSI reporting based on the first control information from the communication terminal which has responded to the instruction to perform the CSI reporting among the at least one communication terminal(s).

In order to solve the above problem, a communication terminal according to the present disclosure includes:

a reception unit configured to receive, from a base station, first control information for instructing at least one communication terminal(s) including the communication terminal to perform CSI (Channel State Information) reporting and second control information for each of the at least one communication terminal(s) to determine whether to respond to the instruction to perform the CSI reporting;

a determination unit configured to determine whether to respond to the instruction to perform the CSI reporting based on the second control information; and a transmission unit configured to, when the determination unit determines to respond to the instruction to perform the CSI reporting, transmit the CSI reporting based on the first control information to the base station.

In order to solve the above problem, a wireless communication method according to the present disclosure includes:

transmitting, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting.

BRIEF DESCRIPTION OF DRAWINGS

The above and other aspects, features and advantages of the present disclosure will become more apparent from the following explanation of certain exemplary embodiments when taken in conjunction with the accompanying drawings, in which:

FIG. 5 is a diagram for explaining a reference RS;

EMBODIMENTS

Hereinafter, embodiments of the present disclosure will be described with reference to the drawings.

Outline of Embodiments

Figure 1:
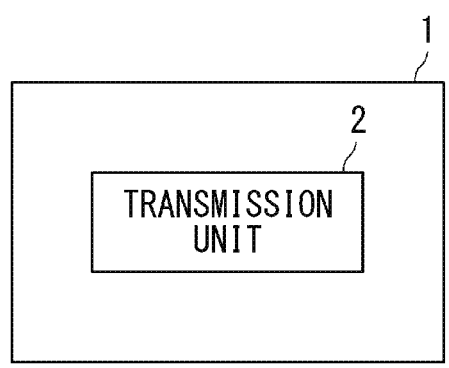
FIG. 1 shows a configuration example of a base station according to an outline of embodiments.

An outline of the embodiments will be described prior to the explanation of the embodiments of the present disclosure. FIG. 1 shows a configuration example of a base station according to the outline of the embodiments.

A base station 1 includes a transmission unit 2.

The transmission unit 2 transmits, to at least one communication terminal(s), first control information instructing the at least one communication terminal(s) to perform CSI reporting and second control information for making each communication terminal determine whether to respond to the instruction to perform the CSI reporting.

As described above, the base station 1 according to the embodiment transmits, to at least one communication terminal(s), the first control information for instructing the at least one communication terminal(s) to perform the CSI reporting and the second control information for making each communication terminal determine whether to respond to the instruction to perform the CSI reporting. The base station 1 makes each communication terminal determine whether to respond to the instruction to perform the CSI reporting based on the second control information. When each communication terminal responds to the instruction to perform the CSI reporting, it performs the CSI reporting according to the first control information. On the other hand, when each communication terminal does not respond to the instruction to perform the CSI reporting, it does not perform the CSI reporting. That is, with the base station 1 according to the embodiment, it is possible to control each communication terminal to perform only the necessary CSI reporting. Thus, according to the embodiments of the present disclosure, it is possible to reduce unnecessary CSI reporting.

First Embodiment

Next, a first embodiment of the present disclosure will be described. A technique as a precondition related to the present disclosure will be described prior to a detailed explanation of the first embodiment.
<CSI Framework of NR>

Figure 2:
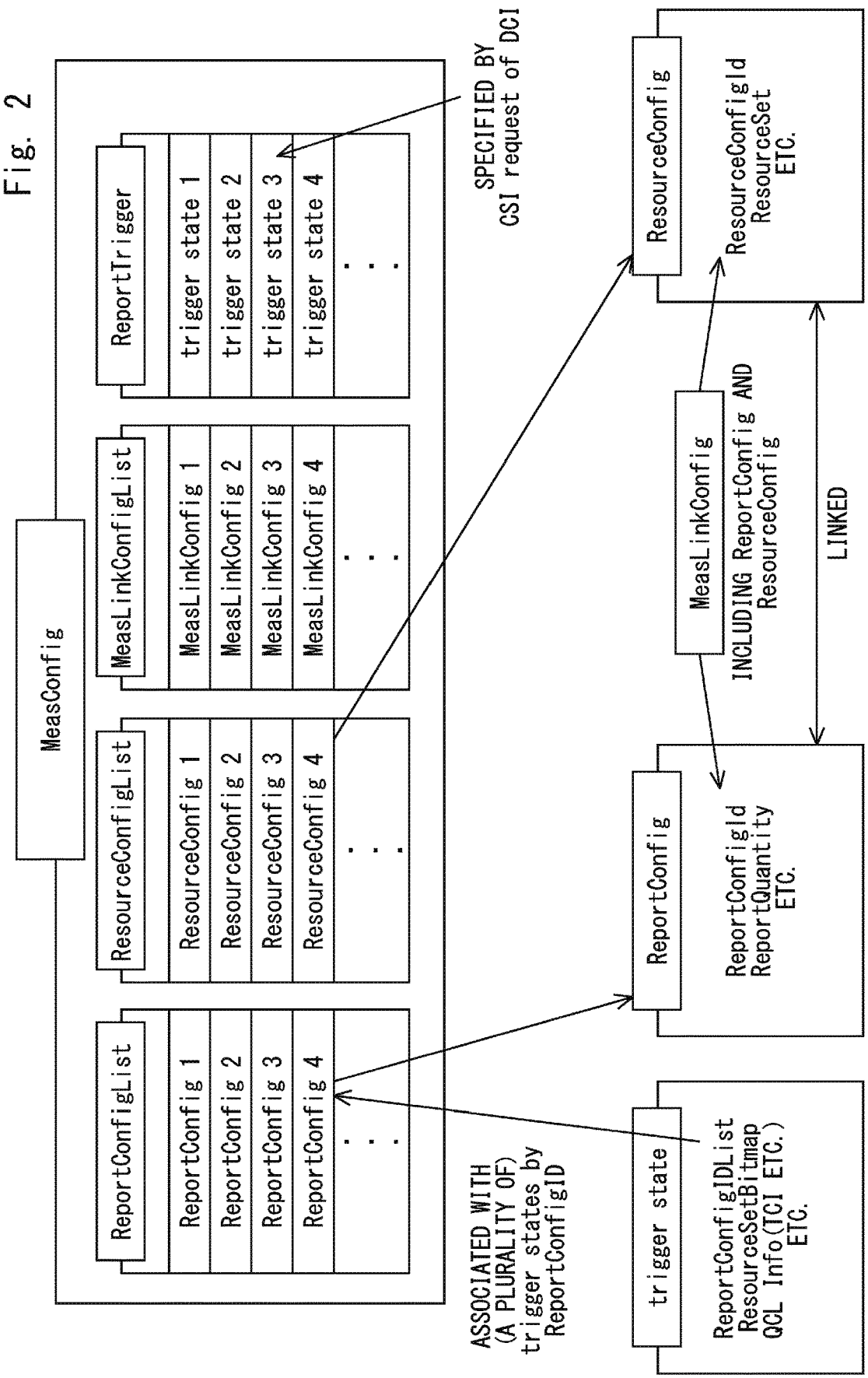
FIG. 2 is a diagram for explaining a CSI framework of NR.

First, a CSI framework of NR will be described with reference to FIG. 2. FIG. 2 is a diagram for explaining a CSI framework of NR. To be more specific, FIG. 2 is a diagram for explaining an RRC (Radio Resource Control) message used for a configuration of aperiodic CSI reporting.

As shown in FIG. 2, the RRC message is used for the configuration of CSI measurement and reporting in the CSI framework of NR. A base station sets one CSI measurement configuration (MeasConfig) using the RRC message. The CSI measurement configuration includes one or more CSI report configurations (ReportConfig), one or more CSI-RS resource configurations (ResourceConfig), and one or more link information (MeasLinkConfig) pieces.

The CSI includes information such as CQI (Channel Quality Indicator), PMI (Precoding Matrix Indicator), CRI (CSI-RS resource indicator), LI (Layer Indication), RI (Rank Indication), and RSRP. Note that the CSI may be configured to include all of the above information or some of the above information. The RSRP constituting the CSI is also referred to as L1-RSRP (Layer 1-Reference Signal Received Power) in order to distinguish it from the RSRP measured for other purposes.

The link information includes an ID of the CSI report configuration, an ID of the CSI-RS resource configuration, and measurement target information (channel or interference). The link information is information which relates the CSI report configuration to the CSI-RS resource configuration to each other.

The CSI report configuration includes a report configuration type (reportConfigType), and is configured to set periodic, semi-persistent, or aperiodic for the periodicity of the CSI reporting.

Further, the CSI report configuration includes report target information (ReportQuantity). When 'CRI/RSRP' is set as the report target information, the communication terminal measures the RSRP of the CSI-RS and performs the CSI reporting. Hereinafter, an operation of the CSI framework when 'CRI/RSRP' is set as the report target information of the CSI report configuration will be described.

The communication terminal specifies the number of CSI-RSs to be measured from the number of CSI-RSs to be reported (nrofReportedRS) included in the CSI report configuration. When the number of CSI-RSs to be measured is set to one, the communication terminal quantizes the RSRP of the CSI-RS to 7 bits using a step size of 1 dB within the range from −140 dBm to −44 dBm. When the number of CSI-RSs to be measured is set to two or more, the communication terminal calculates a maximum value of the RSRP of the plurality of CSI-RSs and calculates a difference between the maximum value of the RSRP and the RSRP of each CSI-RS. The maximum value of the RSRP is quantized to 7 bits, and the difference between the RSRP of the other CSI-RSs and the above maximum value is quantized to 4 bits using a step size of 2 dB.

The CSI-RS resource configuration (ResourceConfig) includes a resource type (ResourceConfigType). The resource type is configured to be able to set one of periodic, semi-persistent, and aperiodic for the periodicity of the CSI-RS. When the resource type is set as "aperiodic", the report configuration type of the associated CSI report configuration also needs to be "aperiodic".

Further, the CSI-RS resource configuration includes one or more CSI-RS resource sets, and the CSI-RS resource set includes one or more CSI-RS resources. The number of antenna ports, time domain resources, and frequency domain resources used for transmitting the CSI-RS are configured for each CSI-RS resource. One CSI-RS resource configuration includes a maximum of 16 CSI-RS resource sets and a maximum of 128 CSI-RS resources. One CSI-RS resource set includes a maximum of 64 CSI-RS resources.

When the report configuration type of the CSI report configuration is "aperiodic" or "semi-persistent", the CSI measurement configuration includes one or more trigger states (ReportTrigger). Note that the trigger state indicates a trigger state included in ReportTrigger. The trigger state is information associated with one or more CSI report configurations. Further, the CSI report configuration is associated with the CSI-RS resource configuration by the link information.

Furthermore, when the report configuration type of the CSI report configuration is "aperiodic", an aperiodic trigger state (AperiodicReportTrigger) is set as the trigger state. When the CSI report configuration corresponding to the aperiodic trigger state is associated with the CSI-RS resource configuration including a plurality of aperiodic CSI-RS resource sets, the aperiodic CSI-RS resource set specified by a bitmap set in the RRC message is selected. The aperiodic CSI-RS is triggered by specifying this aperiodic trigger state in the CSI request field of a maximum of 6 bits included in the DCI. In the following explanation, a CSI request may be referred to as trigger information in some cases. The CSI request can be regarded as request information for the CSI reporting.

The CSI report configuration and CSI-RS resource configuration can be dynamically selected by selecting the aperiodic trigger state in the manner described above.
<Process for Acquiring CSI Report Configuration and CSI-RS Resource Configuration of Aperiodic CSI-RS>

Figure 3:
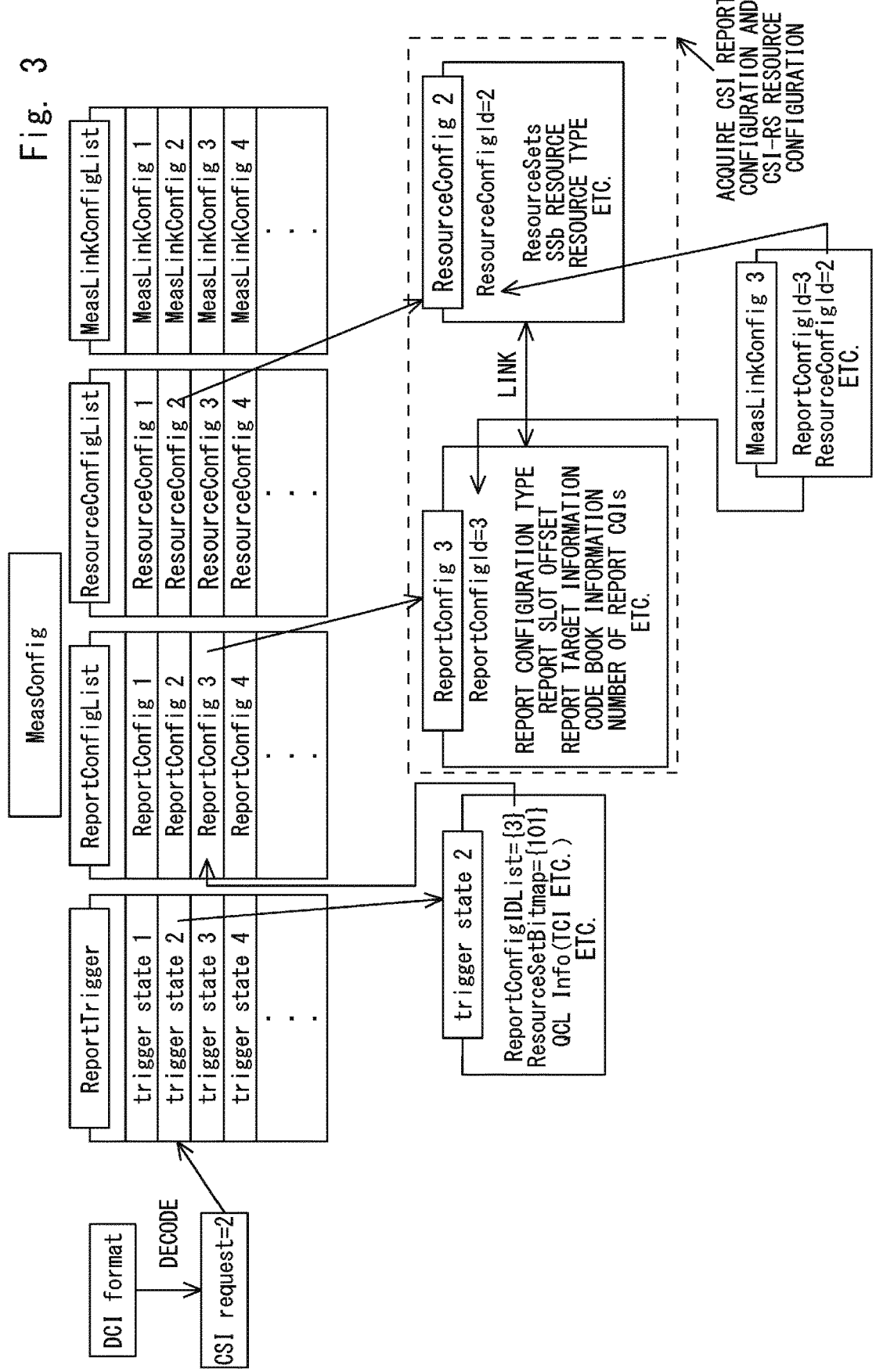
FIG. 3 shows an example of a process for acquiring a CSI report configuration and a CSI-RS resource configuration of an aperiodic CSI-RS.

Next, an example of the process for acquiring the CSI report configuration and the CSI-RS resource configuration of the aperiodic CSI-RS will be described with reference to FIG. 3. FIG. 3 is a diagram for explaining an example of the process for acquiring the CSI report configuration and the CSI-RS resource configuration of the aperiodic CSI-RS.

First, the communication terminal decodes a DCI format and acquires the CSI request. In the example shown in FIG. 3, the communication terminal decodes the DCI format and acquires CSI request=2.

Next, the communication terminal refers to the trigger state corresponding to the acquired CSI request. In the example shown in FIG. 3, since the communication terminal has acquired CSI request=2, it refers to trigger state=2 corresponding to CSI request=2. In the following explanation, "refer" may be described as "acquire", and "acquire" may be described as "refer" in some cases.

Then, the communication terminal refers to a CSI report configuration ID list (ReportConfigIDList) included in the referred trigger state to identify the CSI report configuration (ReportConfig). In the example shown in FIG. 3, since the CSI report configuration ID list included in trigger state=2 is ReportConfigIDList={3}, the communication terminal identifies the CSI report configuration having ReportConfigId of 3.

Next, the communication terminal refers to the link information (MeasLinkConfig), identifies the CSI-RS resource configuration (ResourceConfig) linked with the identified CSI report configuration (ReportConfig), and simultaneously refers to the identified CSI-RS resource configuration. Specifically, the communication terminal refers to MeasLinkConfig which is the link information including an ID of the identified ReportConfig. Since the referred MeasLinkConfig includes the ID of ResourceConfig to be referred to simultaneously, the communication terminal acquires the ResourceConfigId included in the MeasLinkConfig. In the example shown in FIG. 3, since ResourceConfigId=2 is set, the communication terminal simultaneously refers to the CSI-RS resource configuration having ResourceConfigId of 2.

The communication terminal acquires report configuration information from the CSI report configuration having ReportConfigId of 3, which has been identified in the manner described above. Specifically, the communication terminal acquires the report configuration type (one of periodic, semi-persistent, and aperiodic), report slot offset information, report target information, frequency granularity (wide band or sub band), code book information, the number of report CQIs, etc.

Further, the communication terminal acquires the CSI-RS resource set, the SS/PBCH-block resource, the resource type (periodic, semi-persistent, or aperiodic), and so on from the CSI-RS resource configuration having ResourceConfigId of 2, which is being referred to. Since each piece of the information is related as described above, the communication terminal can acquire the CSI report configuration and the CSI-RS resource configuration of the aperiodic CSI-RS using the relation between the respective information pieces.

<CSI-RS Resource Set Selection and CSI-RS Resource Acquisition Process>

Figure 4:
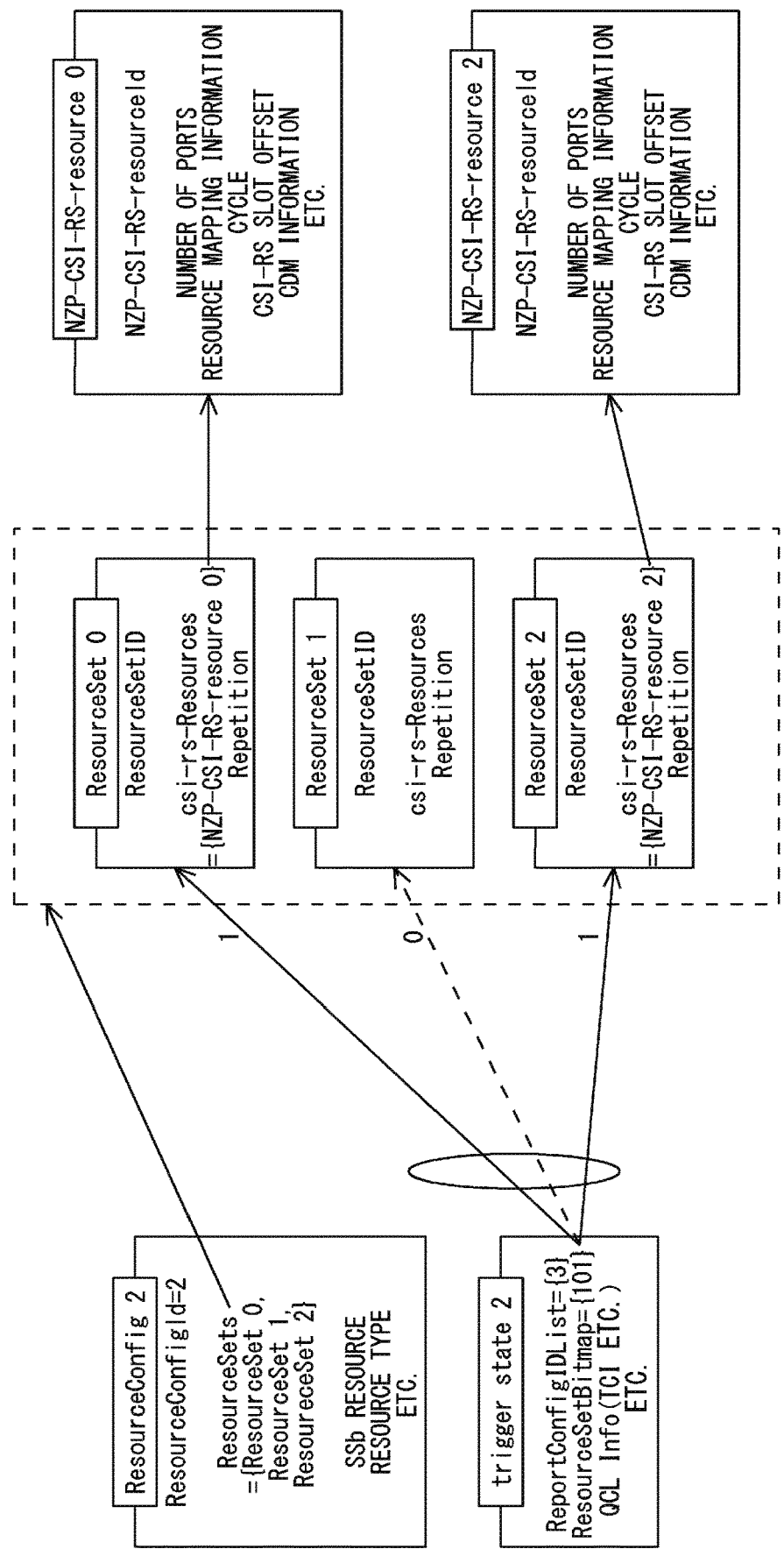
FIG. 4 is a diagram for explaining selection of a CSI-RS resource set and the CSI-RS resource acquisition process after the CSI report configuration and CSI-RS resource configuration are acquired.

Next, selection of the CSI-RS resource set and the CSI-RS resource acquisition process after acquiring the CSI report configuration and the CSI-RS resource configuration will be described with reference to FIG. 4. FIG. 4 is a diagram for explaining the selection of the CSI-RS resource set and the CSI-RS resource acquisition process after acquiring the CSI report configuration and the CSI-RS resource configuration. Note that FIG. 4 is a diagram which assumes that the CSI report configuration and the CSI-RS resource configuration are acquired according to the example shown in FIG. 3.

The communication terminal refers to information (ResourceSets) indicating the association of the CSI-RS resource set included in the CSI-RS resource configuration (ResourceConfig) in which the acquired ResourceConfigid is 2.

Then, when a plurality of CSI-RS resource sets are associated with the CSI report configuration, the communication terminal acquires a resource set bit map (ResourceSetBitmap) associated with the referred trigger state. The bitmap is information indicating which CSI-RS resource set is activated among the CSI-RS resource sets which are set in ResourceSets. Then, the communication terminal selects the CSI-RS resource set associated with the identified CSI report configuration (ReportConfig) from among the CSI-RS resource sets using the acquired resource set bitmap.

In the example shown in FIG. 4, ResourceSet 0, ResourceSet 1, and ResourceSet 2 are set in ResourceSets. Moreover, ResourceSetBitmap={101} included in the trigger state 2 referred to by the communication terminal. Since ResourceSetBitmap={101}, it means that ResourceSet 0 and ResourceSet 2 are activated among ResourceSet 0, ResourceSet 1, and ResourceSet 2. Thus, the communication terminal determines that ResourceSet 0 and ResourceSet 2 are activated, and selects ResourceSet 0 and ResourceSet 2.

Then, the communication terminal refers to the Non-Zero-Power-CSI-RS-resource (NZP-CSI-RS-resource) associated with the CSI-RS resource set. In the example shown in FIG. 4, the communication terminal refers to NZP-CSI-RS-resource 0 and NZP-CSI-RS-resource 2 included in the ResourceSet 0 and ResourceSet 2.

The communication terminal acquires, from the referred CSI-RS resource, CSI-RS resource information such as mapping information to an RE (Resource Element), the number of transmission ports, cycle, CSI-RS slot offset information, and Code Division Multiplexing (CDM) information. The communication terminal identifies, from the CSI-RS resource information acquired in the manner described above, the RE to which the CSI-RS can be transmitted, measures the RSRP with this RE, and reports, to the base station, a measurement result at a timing based on the report slot offset information acquired from the CSI report configuration.

<Reference RS>

Next, a reference RS will be described with reference to FIG. 5. FIG. 5 is a diagram for explaining the reference RS. As shown in FIG. 5, a wireless communication system 100 includes a base station 300 and communication terminals 200 to 203.

The communication terminals 200 to 203 supporting reception beamforming can further improve the gain by forming a reception beam that matches a transmission beam. When the communication terminals 200 to 203 perform reception beamforming, they need to be notified about a spatial feature of a transmission signal (e.g., a directivity pattern) by the base station 300 and acquires it.

In NR, the communication terminals 200 to 203 are notified about the spatial feature of the transmission signal by specifying an RS which enables QCL (Quasi Co-Location) (the pseudo graphic relations are identical) for spatial reception parameters (spatial Rx parameter) to be assumed with this transmission signal.

The spatial reception parameter is, for example, an AOA (Angle of Arrival), an AoD (Angle of Departure), or a spatial correlation of a signal. The fact that the QCL for the spatial reception parameter can be assumed between antenna ports and between RSs means that it can be assumed that the spatial reception parameters are identical for a long term. In the following explanation, "QCL for spatial reception parameters can be assumed" may be described as "spatially QCL" in some cases.

The communication terminals 200 to 203 can expect the same level of reception beamforming gains by forming the same reception beams for the transmission signals which are spatially QCL.

The antenna port of the CSI-RS can be set that it is spatially QCL with an SS/PBCH-block or another CSI-RS. Here, an RS that is used as a reference when a specific antenna port is set as being spatially QCL is referred to as a reference RS. In FIG. 5, among the transmission beams transmitted from the base station 300, a transmission beam B1 shown by the dotted line indicates that the SS/PBCH-block #1 is a transmission beam of the reference RS. Among the transmission beams transmitted from the base station 300, transmission beams B2 shown by the solid lines indicate that they are transmission beams of the CSI-RS which are spatially QCL with the SS/PBCH-block #1. That is, the transmission beams B2 indicate that they are transmission beams having a pseudo geographical relation with the SS/PBCH-block #1.

Further, the base station 300 sets M (M is a natural number of one or more) TCIs (Transmission Configuration Indications) according to the RRC message for each terminal. One TCI corresponds to one spatially QCL RS. The SS/PBCH-block, the periodic CSI-RS, the aperiodic CSI-RS, or the semi-persistent CSI-RS can be specified to this RS. The TCI is used to specify an RS that is spatially QCL with a specific channel or RS.

A list of TCI indices for transmitting a notification about an RS which is spatially QCL with each of the aperiodic CSI-RS resources may be set in the aperiodic trigger state as QCL information (QCL Info).

Hereinafter, the first embodiment of the present disclosure will be described in detail.

Configuration Example of Wireless Communication System

Figure 6:
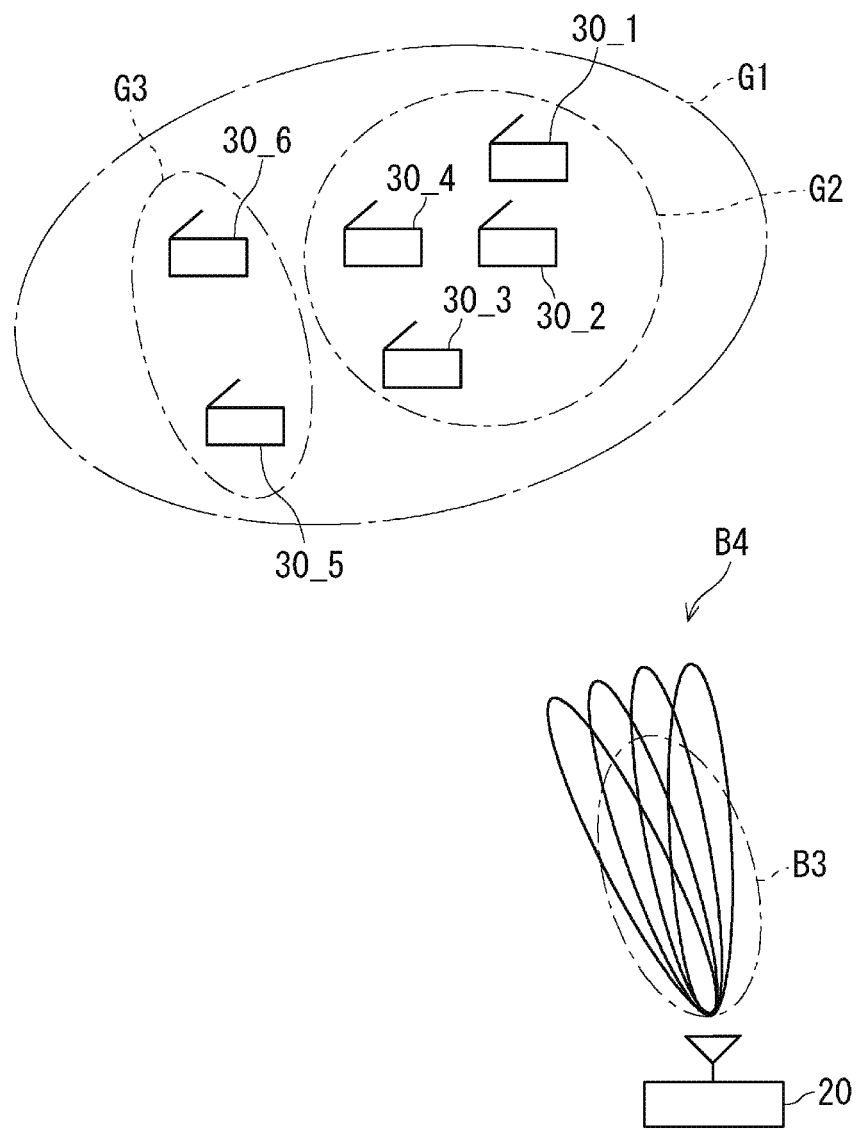
FIG. 6 is a diagram showing a configuration example of a wireless communication system according to a first embodiment.

First, a wireless communication system 10 according to the first embodiment will be described with reference to FIG. 6. FIG. 6 is a diagram showing a configuration example of the wireless communication system according to the first embodiment.

The wireless communication system 10 includes a base station 20 and communication terminals 30_1 to 30_6. The wireless communication system 10 is configured to include one base station 20. However, the wireless communication system 10 may obviously be configured to include two or more base stations. Although the wireless communication system 10 includes the communication terminals 30_1 to 30_6, it may be configured to include one or more communication terminals.

A transmission beam B3 is a transmission beam of the reference RS among the transmission beams transmitted from the base station 20. Transmission beams B4 are transmission beams of the CSI-RS that are spatially QCL with a reference RS among transmission beams transmitted from the base station 20.

The base station 20 corresponds to the base station 1 according to the outline of the embodiments. The base station 20 may be, for example, a base station, a Relay Node (RN), or an access point. The base station 20 may be an NR NodeB (NR NB) or a gNodeB (gNB). Alternatively, the base station 20 may be an eNodeB (evolved Node B or eNB). The base station 20 is a communication apparatus that can communicate with the communication terminals 30_1 to 30_6.

The communication terminals 30_1 to 30_6 may be, for example, mobile stations, UE (User Equipment), or WTRUs (Wireless Transmit/Receive Units). The communication terminals 30_1 to 30_6 are communication apparatuses that can communicate with the base station 20. The communication terminals 30_1 to 30_6 may have the same configuration. The communication terminals 30_1 to 30_6 may be collectively referred to as the communication terminals 30 when they are not distinguished from one another.

The base station 20 instructs the communication terminals 30_1 to 30_6 to perform the CSI reporting. The instructions for the CSI reporting may be transmitted using PDCCH transmitted in a common search space. Alternatively, the instruction to perform the CSI reporting may be transmitted using the PDCCH by DCI for the communication terminals 30_1 to 30_6. The Cyclic Redundancy Check (CRC) given to this DCI may be scrambled (encoded) by an RNTI (Radio Network Temporary Identifier) common to the communication terminals 30_1 to 30_6. The RNTI is an identifier which is set as information unique to a group to which the communication terminals 30_1 to 30_6 belong.

In the following explanation, it is assumed that the instruction to perform the CSI reporting is transmitted using PDCCH by DCI for the communication terminals 30_1 to 30_6. Further, it is assumed that the CRC given to the DCI is scrambled by the RNTI common to the communication terminals 30_1 to 30_6.

The communication terminals 30_1 to 30_6 belong to a communication terminal group G1 which indicates a collection of communication terminals to which the common RNTI is set.

The base station 20 transmits information for determining whether to respond to the instruction to perform the CSI reporting to each of the communication terminals 30_1 to 30_6. Each of the communication terminals 30_1 to 30_6 determines whether to respond to the instruction to perform the CSI reporting based on the information received from the base station 20. When each of the communication terminals 30_1 to 30_6 determines to respond to the instruction to perform the CSI reporting, it performs the CSI reporting. In other words, the base station 20 makes each of the communication terminals 30_1 to 30_6 determine whether to respond to the instruction to perform the CSI reporting and receives the CSI reporting from the communication terminal requiring the CSI reporting.

In FIG. 6, the communication terminals 30_1 to 30_4 perform the CSI reporting. The communication terminals 30_1 to 30_4 belong to a communication terminal group G2 indicating a collection of communication terminals which perform the CSI reporting.

In FIG. 6, the communication terminals 30_5 and 30_6 do not perform the CSI reporting. The communication terminals 30_5 and 30_6 belong to a communication terminal group G3 indicating a collection of communication terminals which do not perform the CSI reporting.

The base station 20 instructs, in the common downlink control information, the communication terminal belonging to the communication terminal group G1 to perform the CSI reporting. Then, the base station 20 makes each of the communication terminals 30_1 to 30_6 determine whether to respond to the instruction to perform the CSI reporting and classifies them into the communication terminal groups G2 and G3. Next, the base station 20 makes only the communication terminals belonging to the communication terminal group G2 perform the CSI reporting. In this manner, the base station 20 instructs the communication terminals 30_1 to 30_6 to perform the CSI reporting using the DCI common to the communication terminals 30_1 to 30_6. Thus, the base station 20 receives the CSI reporting only from the communication terminal requiring the CSI reporting, thereby reducing unnecessary CSI reporting.

Configuration Example of Base Station

Figure 7:
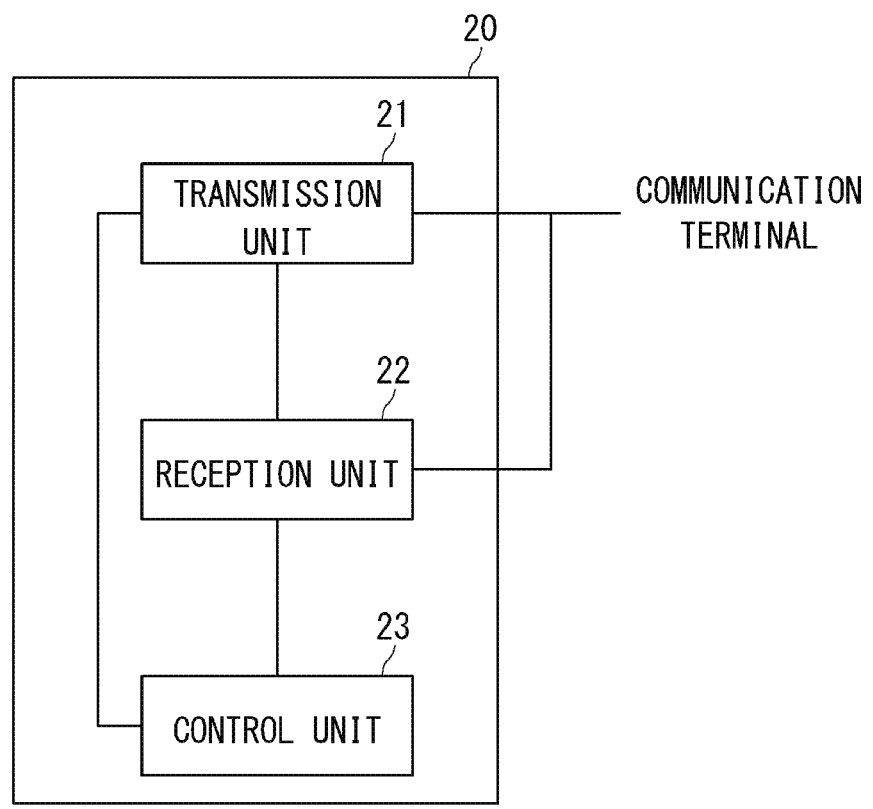
FIG. 7 is a diagram showing a configuration example of a base station according to the first embodiment.

Next, a configuration example of the base station 20 will be described with reference to FIG. 7. FIG. 7 shows a configuration example of a base station according to the first embodiment. The base station 20 includes a transmission unit 21, a reception unit 22, and a control unit 23.

The transmission unit 21 corresponds to the transmission unit 2 according to the outline of the embodiments. The transmission unit 21 transmits, to the communication terminals 30_1 to 30_6, first control information instructing them to perform the CSI reporting and second control information for making each of the communication terminals 30_1 to 30_6 determine whether to respond to the instruction to perform the CSI reporting. Further, the transmission unit 21 performs data communication with each of the communication terminals 30_1 to 30_6 using a transmission beam determined by the control unit 23, which will be described later.

The first control information is information for instructing the communication terminal to perform the CSI reporting. Thus, in the following explanation, the "first control information" may be described as "instruction information for CSI reporting" or simply as "instruction information" in some cases. The second control information is information for making the communication terminal determine whether to respond to the instruction to perform the CSI-RS measurement and CSI reporting. Thus, in the following explanation, the "second control information" will be referred to as "determination information for CSI reporting" or simply as "determination information" in some cases.

The instruction information is information for instructing the communication terminal to perform the CSI-RS measurement and CSI reporting. Specifically, the instruction information includes the trigger information (CSI request) which triggers the CSI-RS measurement and the CSI reporting, the trigger state (ReportTrigger), and the CSI report configuration (ReportConfig). The instruction information further includes the CSI-RS resource configuration (ResourceConfig) and the link information (MeasLinkConfig). The instruction information may include the CSI-RS resource set and an index of a trigger associated with the CSI-RS resource. The instruction information may include all of the above information, or may include only some of the information. Further, the CSI report configuration may include a resource configuration regarding at least one of PUCCH (Physical Uplink Control Channel) and PUSCH (Physical Uplink Shared Channel) as uplink radio resources for transmitting the CSI reporting.

Although the CSI report configuration is described as ReportConfig, it may be CSI-ReportConfig. Further, although the CSI-RS resource configuration is described as ResourceConfig, it may be CSI-ResourceConfig.

The instruction information includes a plurality of trigger information pieces to be candidates for triggering the CSI reporting. As mentioned above, the trigger information is a CSI request. That is, in this embodiment, the instruction information is configured to include a plurality of CSI requests to be candidates. The plurality of CSI requests are transmitted to the communication terminals 30_1 to 30_6. The base station 20 dynamically specifies a value of each CSI request for each of the communication terminals 30_1 to 30_6.

The instruction information is transmitted by the DCI for the communication terminals 30_1 to 30_6. The DCI format for transmitting the instruction information may have the same size as that of the other DCI formats. In this case, the DCI format is identified by scrambling the CRC, which makes it possible to reduce the number of decoding attempts.

The determination information is information for making each of the communication terminals 30_1 to 30_6 determine whether to respond to the instruction to perform the CSI-RS measurement and the CSI reporting. Different values are set for the determination information for each communication terminal. Specifically, the determination information is index information for specifying one of the plurality of CSI requests included in the instruction information. Different values are set for the determination information in the respective communication terminals 30_1 to 30_6. In the following explanation, the "index information" may be referred to as a "CSI request index" in some cases.

The transmission unit 21 makes each of the communication terminals 30_1 to 30_6 determine whether to respond to the instruction to perform the CSI reporting using the plurality of CSI requests included in the instruction information and the index information which is the determination information. The index information may be transmitted from the base station 20 to the communication terminals 30_1 to 30_6 using the RRC message. Alternatively, the index information may be transmitted from the base station 20 to the communication terminals 30_1 to 30_6 using a MAC control element (MAC CE: Medium Access Control Control Element). The MAC CE is information that can control the communication terminal in the MAC layer.

Figure 8:
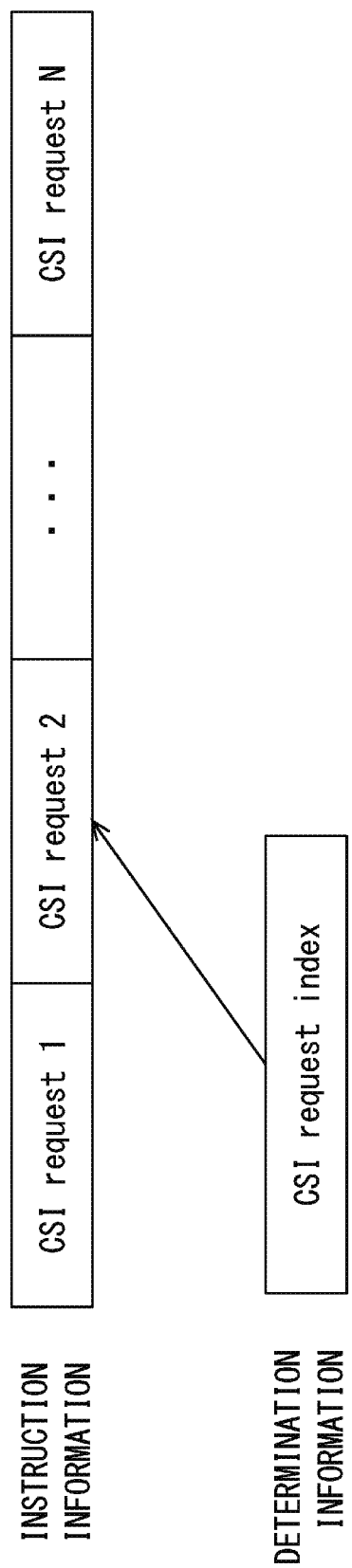
FIG. 8 is a diagram for explaining a relation between instruction information and determination information according to the first embodiment.

Here, the relation between a plurality of CSI requests included in the instruction information and the determination information will be described with reference to FIG. 8. FIG. 8 is a diagram for explaining the relation between the instruction information and the determination information according to the first embodiment.

As shown in FIG. 8, the instruction information includes a plurality of trigger information pieces. The trigger information is composed of CSI request fields linked with each other. Specifically, the plurality of trigger information pieces are composed of N CSI request fields linked with each other in the order of a CSI request 1, a CSI request 2, . . . , and a CSI request N (N is a natural number of 2 or more). A value (information) for specifying the trigger state associated with the CSI request to be referred to by each of the communication terminals 30_1 to 30_6 is set in each of the plurality of CSI requests. For example, when the value of the CSI request is 1, the first trigger state is the corresponding trigger state. Moreover, at least one value (e.g., 0 (zero)) among the values that can be set in the CSI request indicates that the CSI request is deactivated. In the following explanation, when the value of the CSI request is 0 (zero), it will be explained that this CSI request is deactivated. However, it is obvious that the value indicating that the CSI request is deactivated may be values other than 0 (zero).

The determination information is the index information for specifying one of the plurality of CSI requests, and is a CSI request index. As shown in FIG. 8, when the transmission unit 21 sets the CSI request index to 2, the communication terminal that has received this CSI request index acquires a value set in the CSI request 2.

The transmission unit 21 sets the value of the CSI request specified by the CSI request index to a value other than 0 (zero) for the communication terminal that is made to perform the CSI reporting. In the example shown in FIG. 6, the transmission unit 21 sets a value of the CSI request specified by the set CSI request index to a value other than 0 (zero) for the communication terminals 30_1 to 30_4.

On the other hand, the transmission unit 21 sets the value of the CSI request specified by the CSI request index to 0 (zero) for the communication terminal that is not made to perform the CSI reporting. In the example shown in FIG. 6, the transmission unit 21 sets the value of the CSI request specified by the set CSI request index to 0 (zero) for the communication terminals 30_5 and 30_6.

The transmission unit 21 specifies different CSI request indices for the respective communication terminals 30_1 to 30_6, and also controls the value of the CSI request specified by the CSI request index to control whether to make the communication terminal perform the CSI reporting.

Returning to FIG. 7, the reception unit 22 will be described. The reception unit 22 receives the CSI reporting from the communication terminal that transmits the CSI reporting among the communication terminals 30_1 to 30_6. The reception unit 22 may ignore the CSI reporting when the CSI reporting is transmitted from a communication terminal determined that it will not respond to the instruction to perform the CSI reporting. Alternatively, the reception unit 22 may discard the CSI reporting when the CSI reporting is transmitted from a communication terminal determined that it will not respond to the instruction to perform the CSI reporting.

The control unit 23 determines the optimum directivity of the transmission beam for the communication terminal, which has transmitted the CSI reporting, based on the received CSI reporting.

Configuration Example of Communication Terminal

Figure 9:
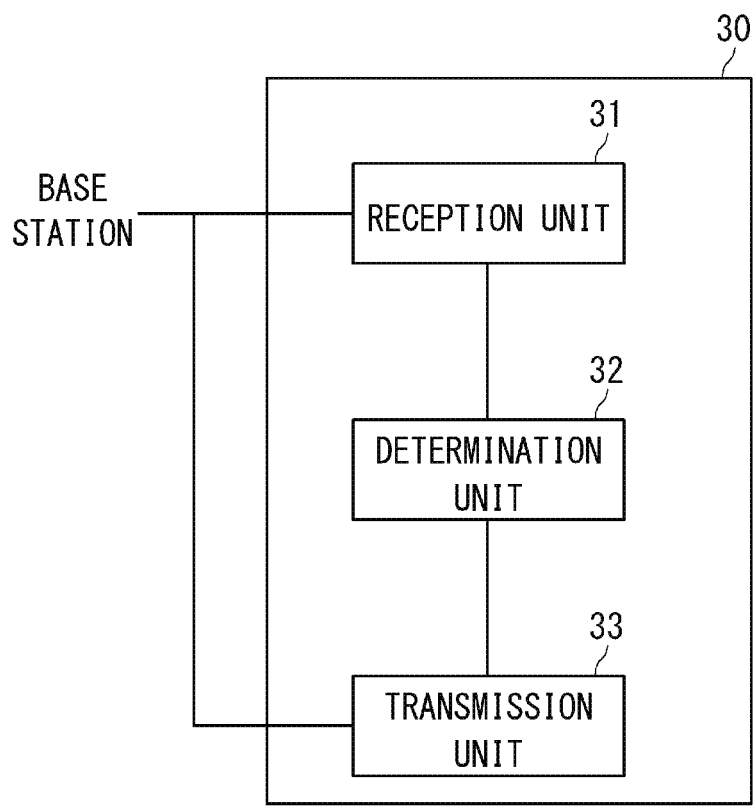
FIG. 9 is a diagram showing a configuration example of a communication terminal according to the first embodiment.

Next, a configuration example of the communication terminal 30 will be described with reference to FIG. 9. FIG. 9 is a diagram showing a configuration example of the communication terminal according to the first embodiment. The communication terminal 30 includes a reception unit 31, a determination unit 32, and a transmission unit 33.

The reception unit 31 receives, from the base station 20, the instruction information for instructing the communication terminal to perform the CSI reporting and the determination information for determining whether to respond to the instruction to perform the CSI reporting. Further, the reception unit 31 receives data transmitted by the transmission unit 21 of the base station 20.

As described above, the instruction information includes the plurality of trigger information pieces indicating information pieces to be candidates for instructing the communication terminal to perform the CSI reporting. Since the trigger information is a CSI request, the instruction information is configured to include a plurality of CSI requests. Further, the determination information is the index information which specifies one of the plurality of CSI requests, and is the CSI request index.

The determination unit 32 determines whether to respond to the instruction to perform the CSI reporting transmitted from the base station 20 based on the CSI request specified by the CSI request index. Specifically, when the value of the CSI request specified by the CSI request index is 0 (zero), the determination unit 32 determines not to respond to the instruction to perform the CSI reporting. That is, when the value of the CSI request specified by the CSI request index is deactivated, the determination unit 32 determines not to respond to the instruction to perform the CSI reporting.

On the other hand, when the value of the CSI request specified by the CSI request index is a value other than 0 (zero), the determination unit 32 determines to respond to the instruction to perform the CSI reporting. That is, when the value of the CSI request specified by the CSI request index is activated, the determination unit 32 determines to perform the CSI reporting.

When the determination unit 32 determines to respond to the instruction to perform the CSI reporting, it measures the RSRP of the CSI-RS associated with the CSI request specified by the CSI request index. Specifically, the determination unit 32 identifies the CSI report configuration and the CSI-RS resource configuration that is linked with this CSI report configuration based on the trigger state corresponding to the CSI request specified by the CSI request index. Then, the determination unit 32 identifies the RE to which the CSI-RS can be transmitted based on the specified CSI-RS resource configuration and measures the RSRP with this RE. When the determination unit 32 determines not to respond to the instruction to perform the CSI reporting, it will not measure the RSRP for the CSI-RS.

When the determination unit 32 determines to respond to the instruction to perform the CSI reporting, the transmission unit 33 transmits the CSI reporting based on the instruction information received from the base station 20 to the base station 20. When the determination unit 32 determines to respond to the instruction to perform the CSI reporting, it can be said that the transmission unit 33 transmits the CSI reporting based on the CSI request specified by the CSI request index to the base station 20. Specifically, the transmission unit 33 includes, in the CSI reporting, a measurement result of the RSRP measured by the determination unit 32 for the CSI-RS associated with the CSI request specified by the CSI request index, and transmits the CSI reporting to the base station 20. When the determination unit 32 determines not to respond to the instruction to perform the CSI reporting, the transmission unit 33 does not transmit the CSI reporting to the base station 20.

Operation Example of Wireless Communication System

Figure 10:
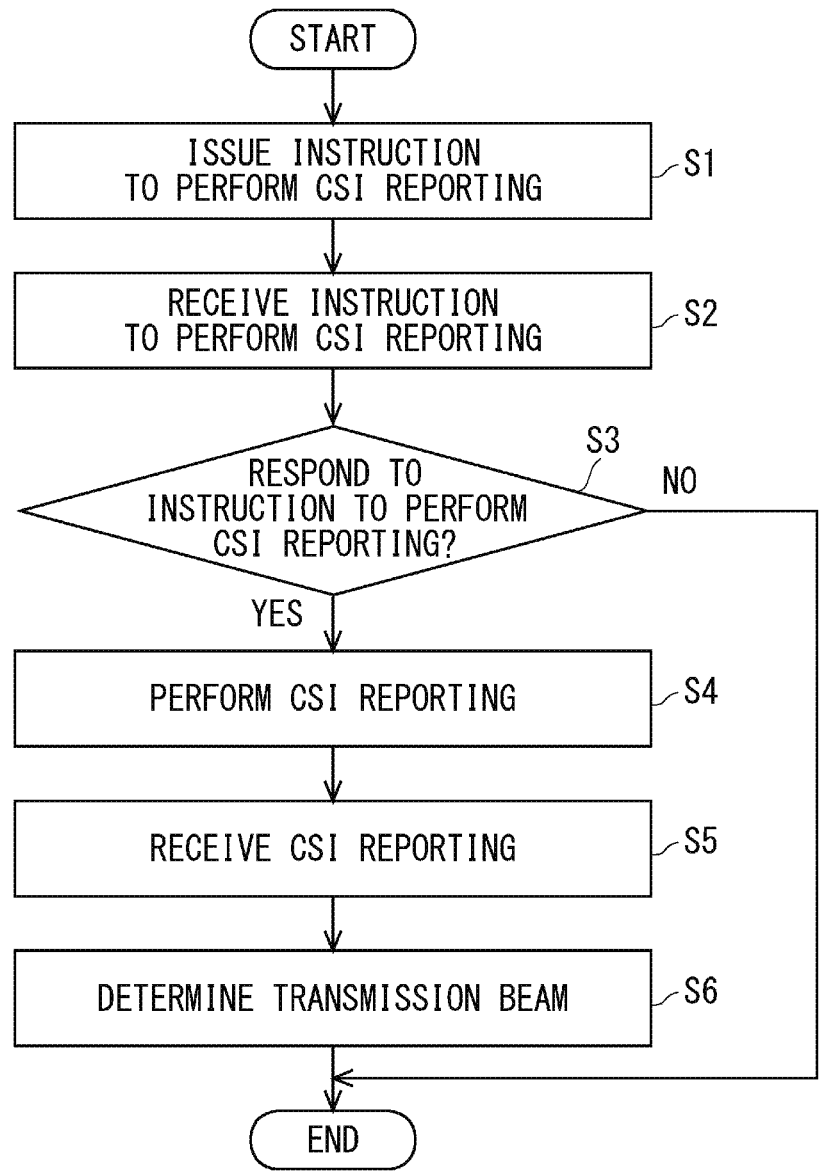
FIG. 10 is a diagram for explaining an operation example of the wireless communication system according to the first embodiment.

Next, an operation example of the wireless communication system 10 according to the first embodiment will be described with reference to FIG. 10. FIG. 10 is a diagram for explaining an operation example of the wireless communication system according to the first embodiment.

First, the base station 20 instructs the communication terminal 30 to perform the CSI reporting (Step S1). Specifically, the transmission unit 21 transmits the instruction information including the plurality of CSI requests and the determination information indicating the CSI request index to the communication terminal 30. At this time, the transmission unit 21 sets a common RNTI for the plurality of communication terminals 30 (the communication terminals 30_1 to 30_6), sets the CSI request index to be referred to by each of the plurality of communication terminals 30 (the communication terminals 30_1 to 30_6), and transmits it to the communication terminals 30.

Next, the communication terminal 30 receives the instruction to perform the CSI reporting from the base station 20 (Step S2), and determines whether to respond to the instruction to perform the CSI reporting (Step S3). Specifically, when the reception unit 31 receives the instruction to perform the CSI reporting from the base station 20, the determination unit 32 decodes the DCI format scrambled using the common RNTI. Then, when the value of the CSI request specified by the CSI request index is 0 (zero), the determination unit 32 determines not to respond to the instruction to perform the CSI reporting. On the other hand, when the CSI request specified by the CSI request index is not 0 (zero), the determination unit 32 determines to respond to the instruction to perform the CSI reporting.

In Step S3, when it is determined that the communication terminal 30 responds to the instruction to perform the CSI reporting (YES in Step S3), the communication terminal 30 transmits the CSI reporting to the base station 20 (Step S4). Specifically, the determination unit 32 acquires the CSI request specified by the CSI request index from the plurality of linked CSI requests on the DCI. Then, the determination unit 32 identifies the CSI report configuration and the CSI-RS resource configuration linked with this CSI-RS resource configuration based on the trigger state specified by the acquired CSI request. As for the terminal which identified the CSI-RS resource configuration, the determination unit 32 identifies the RE to which the CSI-RS can be transmitted based on the CSI-RS resource configuration, and measures the RSRP with this RE. Then, the transmission unit 33 includes, in the CSI reporting, the measurement result measured by the determination unit 32 and transmits it to the base station 20.

On the other hand, if it is determined in Step S3 that the communication terminal 30 does not respond to the instruction to perform the CSI reporting (NO in Step S3), the communication terminal 30 neither measures the RSRP of the CSI-RS nor performs the CSI reporting. Specifically, when the determination unit 32 determines not to respond to the instruction to perform the CSI reporting, it does not measure the RSRP of the CSI-RS and the transmission unit 33 does not transmit the CSI reporting to the base station 20.

When the base station 20 receives the CSI reporting from the communication terminal 30 (Step S5), the base station 20 determines the transmission beam of the communication terminal 30 based on the CSI reporting (Step S6). Although not shown in FIG. 10, when there is data to be transmitted to the communication terminal 30, the base station 20 transmits the data to the communication terminal 30 using the determined transmission beam.

As described above, the base station 20 according to the first embodiment transmits, to the communication terminal 30, the instruction information including the plurality of CSI requests and the determination information indicating the index information for specifying one of the plurality of CSI requests. Then, the communication terminal 30 determines whether to respond to the instruction to perform the CSI reporting based on the CSI request specified by the CSI request index. By doing so, the base station 20 makes the communication terminal requiring the CSI reporting perform the CSI reporting, and does not make the communication terminal not requiring the CSI reporting perform the CSI reporting. Thus, according to this embodiment, it is possible to reduce unnecessary CSI reporting.

Further, as described above, according to this embodiment, it is possible to reduce unnecessary CSI reporting. This makes it possible to effectively reduce consumption of uplink radio resources, thereby effectively reducing an interference with other radio links.

Furthermore, in this embodiment, the base station 20 can transmit a plurality of CSI requests to the communication terminal 30, which makes it possible to set which CSI request to use for each communication terminal. In other words, the base station 20 can set an individual CSI request index for each communication terminal, and can make a flexible configuration by controlling the value of each CSI request. Therefore, according to this embodiment, it is possible to instruct to perform the CSI reporting to each communication terminal 30 without a limitation at the time of setting the trigger state.

Second Embodiment

Next, a second embodiment will be described. In the second embodiment, instruction information for CSI reporting and determination information for the CSI reporting differ from those according to the first embodiment.

Also in the second embodiment, as shown in FIG. 6, the base station 20 instructs, in the common downlink control information, the communication terminal belonging to the communication terminal group G1 to perform the CSI reporting. Then, the base station 20 makes each of the communication terminals 30_1 to 30_6 determine whether to respond to the instruction to perform the CSI reporting and classifies them into the communication terminal groups G2 and G3. Next, the base station 20 makes only the communication terminals belonging to the communication terminal group G2 perform the CSI reporting. In this manner, the base station 20 instructs the communication terminals 30_1 to 30_6 to perform the CSI reporting using the DCI common to the communication terminals 30_1 to 30_6. Thus, the base station 20 receives the CSI reporting only from the communication terminal requiring the CSI reporting, thereby reducing unnecessary CSI reporting.

Basic configurations of the base station and the communication terminal according to the second embodiment are the same as those according to the first embodiment, and thus they will be described with reference to FIGS. 7 and 9. Hereinafter, differences between the second embodiment and the first embodiment will be described.

Configuration Example of Base Station

A configuration example of the base station 20 according to the second embodiment will be described with reference to FIG. 7. A configuration of the transmission unit 21 of the base station 20 according to the second embodiment differs from that according to the first embodiment. Also in this embodiment, the transmission unit 21 transmits, to the communication terminal 30_1 to 30_6, the instruction information for the CSI reporting which instructs the communication terminals 30_1 to 30_6 to perform the CSI reporting and the determination information which makes the communication terminal 30_1 to 30_6 determine whether to respond to the instruction to perform the CSI reporting. Note that the instruction information is the first control information according to the first embodiment, and the determination information is the second control information according to the first embodiment.

Firstly, also in this embodiment, the instruction information includes the trigger information (CSI request) which triggers the CSI-RS measurement and the CSI reporting, the trigger state (ReportTrigger), and the CSI report configuration (ReportConfig). The instruction information further includes the CSI-RS resource configuration (ResourceConfig) and the link information (MeasLinkConfig).

In the first embodiment, the instruction information includes a plurality of trigger information pieces to be candidates (the CSI Request). In this embodiment, the instruction information includes the trigger information (the CSI request) common to the communication terminals 30_1 to 30_6. That is, in this embodiment, the trigger information used for the instruction information is a single trigger information piece and is trigger information common to the communication terminals 30_1 to 30_6. Moreover, the instruction information includes the CSI report configuration (ReportConfig) which is configuration information for the CSI reporting associated with the trigger information common to the communication terminals 30_1 to 30_6.

Further, in the first embodiment, the determination information is the index information for specifying one of the plurality of trigger information pieces. In this embodiment, the determination information is information indicating whether the CSI report configuration (ReportConfig) identified from the trigger information is activated.

To be more specific, in this embodiment, the determination information is set whether the CSI report configuration (ReportConfig) identified from the trigger information is activated using the MAC CE in the determination information. Then, the transmission unit 21 makes each of the communication terminals 30_1 to 30_6 determine whether to respond to the instruction to perform the CSI reporting using the information set using the MAC CE.

Figure 11:
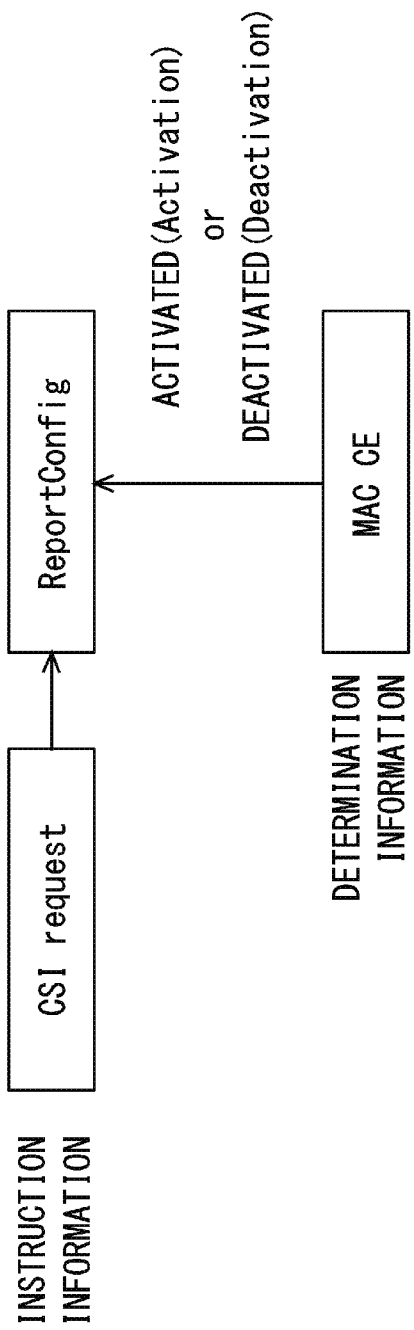
FIG. 11 is a diagram for explaining a relation between instruction information and determination information according to a second embodiment.

Here, the relation between the instruction information and the determination information according to this embodiment will be described with reference to FIG. 11. FIG. 11 is a diagram for explaining the relation between the instruction information and the determination information according to the second embodiment.

As shown in FIG. 11, the instruction information includes a single trigger information piece (the CSI request), and the trigger information is common to the communication terminals 30_1 to 30_6. The instruction information also includes the CSI report configuration (ReportConfig) associated with the trigger information. Specifically, the CSI report configuration associated with the trigger information is the CSI report configuration identified from the trigger state corresponding to the trigger information. Although the trigger information is common to the communication terminals 30_1 to 30_6, the trigger state and the CSI report configuration are not common to the communication terminals 30_1 to 30_6 and instead are set individually for each communication terminal.

The determination information is information indicating whether the CSI report configuration associated with the trigger information is activated or deactivated. The determination information is information that is set as to whether the CSI report configuration identified by the common trigger information using the MAC CE is activated.

The transmission unit 21 sets, to activated, the CSI configuration reporting identified from the trigger information for the communication terminal 30 that is made to perform the CSI reporting using the MAC CE, so that the communication terminal 30 is made to perform the CSI reporting. On the other hand, the transmission unit 21 sets, to deactivated, the CSI configuration reporting identified from the trigger information for the communication terminal 30 that is not made to perform the CSI reporting using the MAC CE, so that the communication terminal 30 is made to determine not to respond to the instruction to perform the CSI reporting. In the example shown in FIG. 6, the transmission unit 21 sets, to activated, the CSI report configuration identified from the trigger information for the communication terminals 30_1 to 30_4 using the MAC CE. Further, the transmission unit 21 sets, to deactivated, the CSI report configuration identified from the trigger information for the communication terminals 30_5 and 30_6 using the MAC CE.

Configuration Example of Communication Terminal

Next, a configuration example of the communication terminal 30 will be described with reference to FIG. 9. In this embodiment, the configuration of the determination unit 32 differs from that according to the first embodiment. As described above, the instruction information and the determination information are different from those according to the first embodiment. However, like the first embodiment, the reception unit 31 receives, from the base station 20, the instruction information for the CSI reporting and the determination information about whether to respond to the instruction to perform the CSI reporting.

When the determination unit 32 receives the instruction information and the determination information, it decodes the DCI format scrambled by the RNTI set by the base station 20. Then, the determination unit 32 determines whether to respond to the instruction to perform the CSI reporting based on the CSI report configuration identified by the decoded CSI request and the received determination information.

Specifically, the determination unit 32 determines whether the identified CSI report configuration is activated with reference to the MAC CE. When the identified CSI report configuration is activated, the determination unit 32 identifies the CSI-RS resource configuration that is linked with the CSI report configuration to identify the RE to which the CSI-RS can be transmitted from the CSI-RS resource configuration. Then, the determination unit 32 measures the RSRP with this RE. On the other hand, when the identified CSI report configuration is deactivated, the determination unit 32 determines not to respond to the instruction to perform the CSI reporting and does not measure the CSI-RS.

Operation Example of Wireless Communication System

Next, an operation example of the wireless communication system according to the second embodiment will be described. An operation example of the wireless communication system according to the second embodiment is basically the same as that according to the first embodiment. Thus, an operation example of the wireless communication system according to the second embodiment will be described with reference to FIG. 10. Further, an explanation of the same operations according to the second embodiment as those according to the first embodiment will be omitted in the operation example of the wireless communication system according to the second embodiment.

First, the base station 20 instructs the communication terminal 30 to perform the CSI reporting (Step S1). Specifically, the transmission unit 21 transmits the instruction information and the determination information to the communication terminal 30. As described above, the instruction information includes a single trigger information piece and is trigger information common to the communication terminals 30. Further, the instruction information includes the CSI report configuration associated with the trigger information. Information indicating whether the CSI report configuration associated with the trigger information is activated is set in the determination information by the MAC CE. Furthermore, the transmission unit 21 sets a common RNTI in the plurality of communication terminals 30.

Next, the communication terminal 30 receives the instruction to perform the CSI reporting from the base station 20 (Step S2), and determines whether to respond to the instruction to perform the CSI reporting (Step S3). Specifically, when the reception unit 31 receives the instruction to perform the CSI reporting from the base station 20, the determination unit 32 decodes the DCI format scrambled by the common RNTI. Then, the determination unit 32 refers to the trigger state from the CSI request and identifies the CSI report configuration from an ID of the CSI configuration reporting included in the referred trigger state. The determination unit 32 determines whether the identified CSI report configuration is activated or deactivated using the MAC CE received as the determination information. When the CSI report configuration identified from the CSI request, which is the trigger information, is activated, the determination unit 32 determines to respond to the instruction to perform the CSI reporting. On the other hand, when the CSI report configuration identified from the CSI request, which is the trigger information, is deactivated, the determination unit 32 determines not to respond to the instruction to perform the CSI reporting.

In Step S3, when it is determined that the communication terminal 30 responds to the instruction to perform the CSI reporting (YES in Step S3), the communication terminal 30 transmits the CSI reporting to the base station 20 (Step S4). Specifically, when the determination unit 32 determines to respond to the instruction to perform the CSI reporting in Step S4, it identifies the CSI-RS resource configuration that is linked with the CSI report configuration, and identifies the RE to which the CSI-RS can be transmitted from the CSI-RS resource configuration. Then, the determination unit 32 measures the RSRP of the CSI-RS with this RE.

On the other hand, if it is determined in Step S3 that the communication terminal 30 does not respond to the instruction to perform the CSI reporting (NO in Step S3), the communication terminal 30 neither measures the RSRP of the CSI-RS nor performs the CSI reporting. Specifically, when the identified CSI report configuration is deactivated, the determination unit 32 determines not to respond to the instruction to perform the CSI reporting and does not measure the CSI-RS.

Step S5 and the following steps are the same as those according to the first embodiment, and thus explanation thereof will be omitted.

As described above, also in this embodiment, the base station 20 transmits the instruction information and the determination information to the communication terminal 30. The instruction information includes the trigger information common to the plurality of communication terminals 30 and the CSI report configuration identified from the trigger information. Further, the determination information indicates whether the CSI report configuration identified from the trigger information is activated, and is set using the MAC CE. Then, the communication terminal 30 determines whether to respond to the instruction to perform the CSI reporting using the MAC CE. By doing so, the base station 20 makes the communication terminal requiring the CSI reporting perform the CSI reporting, and does not make the communication terminal not requiring the CSI reporting perform the CSI reporting. Thus, according to this embodiment, it is possible to reduce unnecessary CSI reporting.

Further, as described above, according to this embodiment, it is possible to reduce unnecessary CSI reporting. This makes it possible to effectively reduce consumption of uplink radio resources, thereby effectively reducing an interference with other radio links.

In the second embodiment, since the trigger information common to the plurality of communication terminals 30 is used, the number of bits of the instruction information can be smaller than that in the first embodiment. In other words, in the second embodiment, the number of bits of DCI is smaller than that in the first embodiment. Therefore, according to the second embodiment, it is possible to effectively reduce the overhead of the control information as compared with the first embodiment.

Third Embodiment

Next, a third embodiment will be described. Instruction information and determination information according to the third embodiment differs from those according to the first and second embodiments.

Also in the third embodiment, as shown in FIG. 6, the base station 20 instructs, in the common downlink control information, the communication terminals belonging to the communication terminal group G1 to perform the CSI reporting. Then, the base station 20 makes each of the communication terminals 30_1 to 30_6 determine whether to respond to the instruction to perform the CSI reporting and classifies them into the communication terminal groups G2 and G3. Next, the base station 20 makes only the communication terminals belonging to the communication terminal group G2 perform the CSI reporting. In this manner, the base station 20 instructs the communication terminals 30_1 to 30_6 to perform the CSI reporting using the DCI common to the communication terminals 30_1 to 30_6. Thus, the base station 20 receives the CSI reporting only from the communication terminal requiring the CSI reporting, thereby reducing unnecessary CSI reporting.

Since the basic configuration of the base station according to the third embodiment is the same as that according to the first and second embodiments, it will be described with reference to FIG. 7. Hereinafter, differences between the third embodiment and the first embodiment will be described.

Configuration Example of Base Station

A configuration example of the base station 20 according to the third embodiment will be described with reference to FIG. 7. A transmission unit 21 of the base station 20 according to the third embodiment has a configuration different from that according to the first and second embodiments. Also in this embodiment, the transmission unit 21 transmits the instruction information and the determination information to communication terminals 30_1 to 30_6. Note that the instruction information is first control information according to the first and second embodiments, and the determination information is second control information according to the first and second embodiments.

Firstly, also in this embodiment, the instruction information includes the trigger information (CSI request) which triggers the CSI-RS measurement and the CSI reporting, the trigger state (ReportTrigger), and the CSI report configuration (ReportConfig). The instruction information further includes the CSI-RS resource configuration (ResourceConfig) and the link information (MeasLinkConfig).

In this embodiment as well, like the second embodiment, the instruction information includes trigger information (CSI request) common to the communication terminals 30_1 to 30_6. In this embodiment, TCI included in QCL information (QCL Info) included in the trigger state associated with the trigger information is used as the instruction information. The TCI is identification information for identifying a reference RS (reference signal) used for the CSI report. The reference RS is CSI-RS or SS/PBCH-block. Although the trigger information is common to the communication terminals 30_1 to 30_6, the trigger state is not common to the communication terminals 30_1 to 30_6 and instead is set individually for each communication terminal. That is, the TCI included in the trigger state is individually set for each terminal.

Further, in this embodiment, the determination information includes a threshold used for determining whether to respond to an instruction to perform CSI reporting. The threshold may be set by an RRC message or may be set by the MAC CE.

The transmission unit 21 makes the communication terminals 30_1 to 30_6 compare the measurement result included in the history of the measurement result of the reference RS identified by the TCI associated with the trigger information included in the instruction information with the threshold included in the determination information. Then, the transmission unit 21 makes the communication terminals 30_1 to 30_6 determine whether to respond to the instruction to perform the CSI reporting based on the comparison result. The process for determining whether to implement the CSI reporting will be described later.

Configuration Example of Communication Terminal

Figure 12:
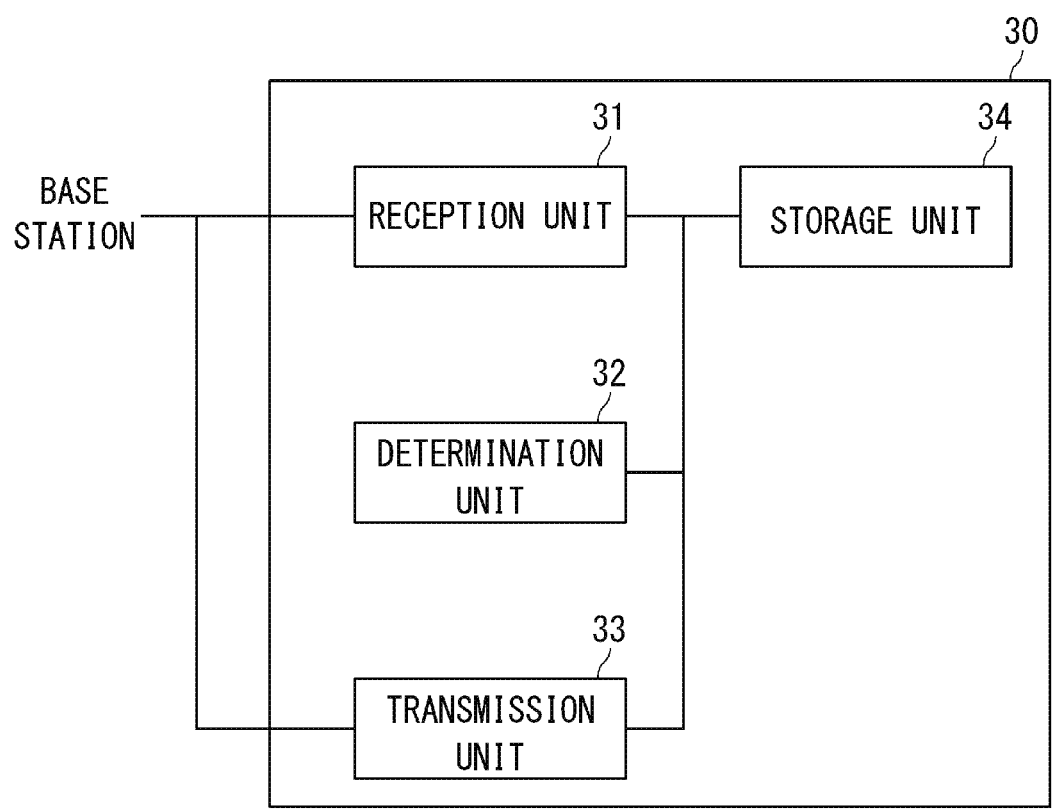
FIG. 12 is a diagram showing a configuration example of a communication terminal according to a third embodiment.

Next, a configuration example of the communication terminal 30 will be described with reference to FIG. 12. FIG. 12 shows a configuration example of the communication terminal according to the third embodiment. In this embodiment, a storage unit 34 is further included in addition to the components of the communication terminal 30 according to the first and second embodiments. Further, a configuration of a determination unit 32 according to this embodiment differs from that according to the first and second embodiments. As described above, although the instruction information and the determination information according to the third embodiment differ from those according to the first and second embodiments, in the third embodiment, the reception unit 31 receives the instruction information and the determination information from the base station 20.

When the determination unit 32 receives the instruction information and the determination information, it decodes the DCI format scrambled by the RNTI set by the base station 20 and acquires the TCI included in the trigger state associated with the decoded CSI request. That is, the determination unit 32 acquires the TCI associated with the CSI request.

The determination unit 32 refers to a measurement history table T1 which stores the history of the measurement result of the reference RS corresponding to the acquired TCI. The measurement history table T1 is stored in the storage unit 34, which will be described later. The determination unit 32 acquires the measurement result of the reference RS corresponding to the acquired TCI from the measurement history table T1 and determines whether to respond to the instruction to perform the CSI reporting according to whether the acquired measurement result is greater than or equal to the threshold received as the determination information.

The measurement result is the RSRP. Note that the measurement result may be RSRQ (Reference Signal Received Quality).

Figure 13:
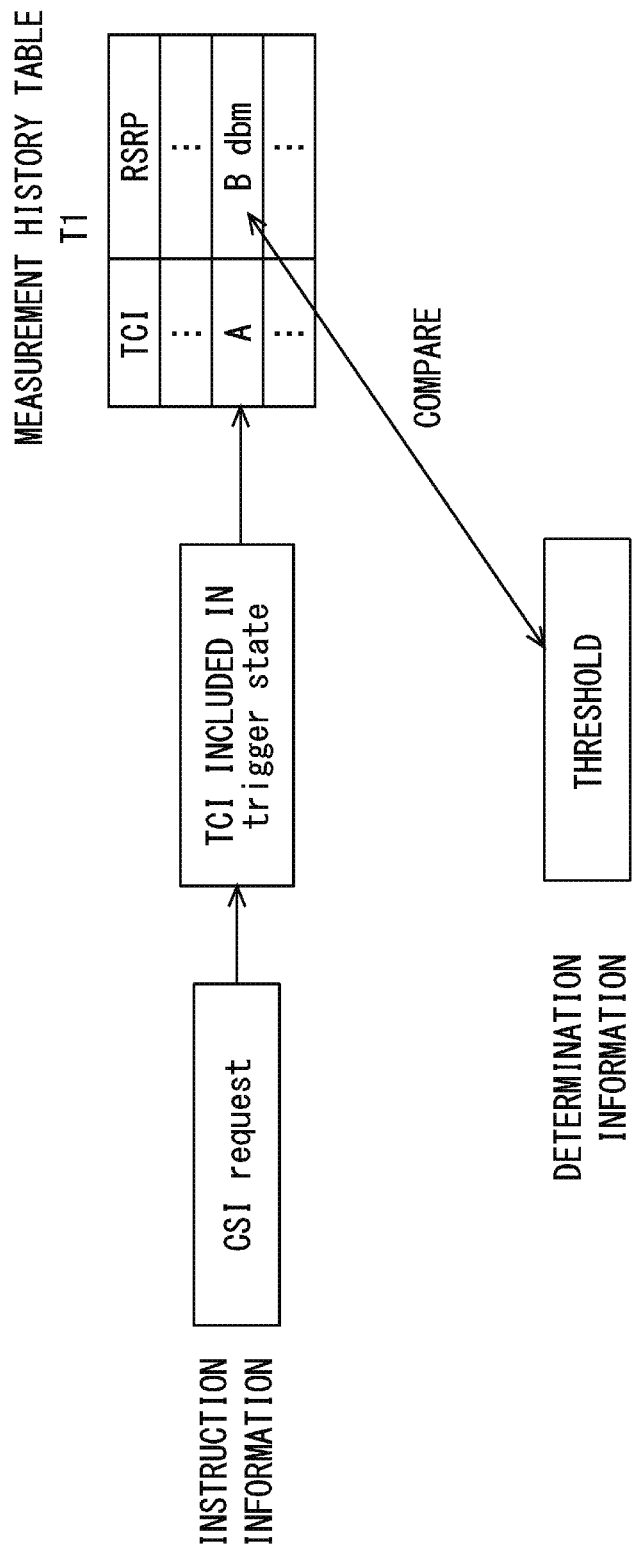
FIG. 13 is a diagram for explaining determination of whether to implement CSI reporting in the third embodiment.

Here, the determination of whether to implement the CSI reporting performed by the determination unit 32 will be described with reference to FIG. 13. FIG. 13 is a diagram for explaining the determination of whether to implement the CSI reporting according to the third embodiment. The relation between the instruction information and the determination information will also be described with reference to FIG. 13.

As shown in FIG. 13, the instruction information includes a single trigger information piece (the CSI request), and the trigger information is common to the communication terminals 30_1 to 30_6. The instruction information also includes the TCI which identifies the reference RS associated with the trigger information. Specifically, the TCI which identifies the reference RS associated with the trigger information is set in the QCL information included in the trigger state corresponding to the trigger information. Although the trigger information is common to the communication terminals 30_1 to 30_6, the trigger state is not common to the communication terminals 30_1 to 30_6 and instead is set individually for each communication terminal.

The determination information includes a threshold used for determining whether to implement the CSI reporting.

The measurement history table T1 is configured in such a way that the TCI is associated with the measurement result transmitted from the base station 20 as the CSI reporting, which is the past measurement result of the reference RS identified by the TCI.

The determination unit 32 acquires the TCI based on the instruction information and the determination information. The determination unit 32 refers to the measurement history table T1 and acquires the measurement result of the reference RS corresponding to the acquired TCI from the measurement history table T1. In the example shown in FIG. 13, assuming that the acquired TCI is A, the determination unit 32 acquires the RSRP, which is the past measurement result where the TCI is A, from the measurement history table T1. Suppose that the measurement result for the TCI of A is B dBm. The determination unit 32 compares the acquired measurement result with the threshold included in the determination information.

When B dBm is greater than or equal to the threshold, the determination unit 32 determines to respond to the instruction to perform the CSI reporting. In this case, the determination unit 32 identifies the CSI report configuration associated with the trigger state specified by the received CSI request, and the CSI-RS resource configuration linked with this CSI report configuration. Then, the determination unit 32 identifies the RE to which the CSI-RS can be transmitted from the CSI-RS resource configuration, and measures the RSRP with this RE.

On the other hand, when B dBm is less than the threshold, the determination unit 32 determines not to respond to the instruction to perform the CSI reporting. In this case, the determination unit 32 does not measure the CSI-RS. The reason why it is determined not to respond to the instruction to perform the CSI reporting is that when the measurement result (e.g., the RSRP) of the reference RS is a value smaller than the threshold, the RSRP of the CSI-RS which is spatially QCL with the reference RS is considered to be also small.

The storage unit 34 stores the measurement history table T1. The storage unit 34 stores a program for controlling the communication terminal 30, various configuration information pieces, and so on. Note that the determination unit 32 may store the measurement history table T1.

Operation Example of Wireless Communication System

Next, an operation example of the wireless communication system according to the third embodiment will be described. The operation example of the wireless communication system according to the third embodiment is basically the same as that according to the first and second embodiments. Thus, an operation example of the wireless communication system according to the third embodiment will be described with reference to FIG. 10. Further, an explanation of the same operations according to the third embodiment as those according to the first and second embodiments will be omitted in the operation example of the wireless communication system according to the third embodiment.

First, the base station 20 instructs the communication terminal 30 to perform the CSI reporting (Step S1). Specifically, the transmission unit 21 transmits the instruction information and the determination information to the communication terminal 30. The instruction information includes a single trigger information piece and is trigger information common to the communication terminals 30.

Further, the instruction information includes the TCI which identifies the reference RS associated with the trigger information. The determination information includes a threshold used for determining whether to respond to the instruction to perform the CSI reporting. Furthermore, the transmission unit 21 sets a common RNTI for communication terminals 30.

Next, the communication terminal 30 receives the instruction to perform the CSI reporting from the base station 20 (Step S2), and determines whether to respond to the instruction to perform the CSI reporting (Step S3). Specifically, when the reception unit 31 receives the instruction to perform the CSI reporting from the base station 20, the determination unit 32 decodes the DCI format scrambled by the common RNTI and acquires the CSI request. The determination unit 32 acquires the TCI included in the trigger state specified by the acquired CSI request.

The determination unit 32 acquires the history of the RSRP measurement result of the reference RS (CSI-RS or SS/PBCH-block) corresponding to the acquired TCI from the measurement result history table T1. The determination unit 32 determines whether the acquired RSRP is equal to or greater than the threshold. In other words, when the RSRP of the reference RS corresponding to the acquired TCI has been measured in the past and reported to the base station 20, the determination unit 32 determines whether this RSRP is greater than or equal to the threshold.

In Step S3, when it is determined that the communication terminal 30 responds to the instruction to perform the CSI reporting (YES in Step S3), the communication terminal 30 transmits the CSI reporting to the base station 20 (Step S4). Specifically, the determination unit 32 identifies the CSI report configuration associated with the trigger state specified by the received CSI request, and the CSI-RS resource configuration linked with this CSI report configuration. Then, the determination unit 32 identifies the RE to which the CSI-RS can be transmitted from the identified CSI-RS resource configuration and measures the RSRP of the CSI-RS with this RE.

On the other hand, if it is determined in Step S3 that the communication terminal 30 does not respond to the instruction to perform the CSI reporting (NO in Step S3), the communication terminal 30 neither measures the RSRP of the CSI-RS nor performs the CSI reporting. Specifically, in Step S3, when the RSRP of the reference RS corresponding to the acquired TCI has been measured in the past, and when the RSRP reported to the base station 20 is less than the threshold, the determination unit 32 determines not to respond to the instruction to perform the CSI reporting. In this case, the determination unit 32 does not measure the CSI-RS.

Step S5 and the following steps are the same as those according to the first embodiment, and thus explanation thereof will be omitted.

As described above, also in this embodiment, the base station 20 transmits the instruction information and the determination information to the communication terminal 30. The instruction information includes the trigger information common to the plurality of communication terminals 30 and includes the TCI corresponding to the reference RS associated with the trigger information. Further, the determination information includes a threshold used for determining whether to respond to the instruction to perform the CSI reporting using the measurement result of the reference RS identified from the TCI. Then, the communication terminal 30 determines whether to respond to the instruction to perform the CSI reporting using the threshold. By doing so, the base station 20 makes the communication terminal requiring the CSI reporting perform the CSI reporting, and does not make the communication terminal not requiring the CSI reporting perform the CSI reporting. Thus, according to this embodiment, it is possible to reduce unnecessary CSI reporting.

Further, as described above, according to this embodiment, it is possible to reduce unnecessary CSI reporting. This makes it possible to effectively reduce consumption of uplink radio resources, thereby effectively reducing an interference with other radio links.

Further, in the third embodiment, it is possible for the communication terminal 30 to determine whether to respond to the instruction to perform the CSI reporting. Therefore, the base station 20 can reduce the amount of data set as the control information instructing the communication terminal 30 to perform the CSI reporting as compared with the first and second embodiments. Therefore, according to the third embodiment, it is possible to effectively reduce consumption of uplink radio resources as compared to the first and second embodiments.

Other Embodiments

Figure 14:
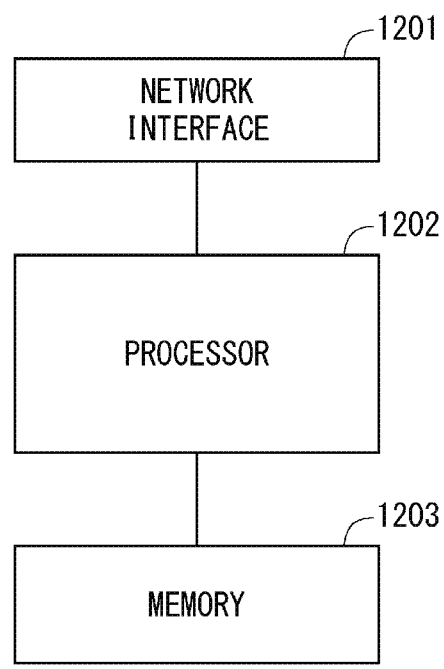
FIG. 14 is a schematic configuration diagram showing a configuration example of a base station and a communication terminal according to other embodiments.

FIG. 14 is a block diagram showing a configuration example of the base stations 1 and 20 and the communication terminal 30 (hereinafter referred to as the base station 1 and so on) described in the above embodiments. Referring to FIG. 14, the base station 1 and so on include a network interface 1201, a processor 1202, and a memory 1203. The network interface 1201 is used to communicate with other wireless communication devices. The network interface 1201 may include, for example, a network interface card (NIC) conforming to IEEE 802.11 series and IEEE 802.3 series.

The processor 1202 performs processes of the base station 1 and the like described using the flowchart in the above embodiments by reading out and executing software (a computer program) from the memory 1203. The processor 1202 may be, for example, a microprocessor, an MPU (Micro Processing Unit), or a CPU (Central Processing Unit). The processor 1202 may include a plurality of processors.

The memory 1203 is composed of a combination of a volatile memory and a nonvolatile memory. The memory 1203 may include a storage physically separate from the processor 1202. In this case, the processor 1202 may access the memory 1203 via an I/O interface (not shown).

In the example of FIG. 14, the memory 1203 is used to store software modules. The processor 1202 can perform processing of the base station 1 and the like described in the above embodiments by reading out and executing these software modules from the memory 1203.

As described with reference to FIG. 14, each of the processors included the base station 1 and the like executes one or a plurality of programs including instructions for causing a computer to execute an algorithm described with reference to the drawings.

According to the embodiments of the present disclosure, it is possible to provide a base station, a communication terminal, and a wireless communication method capable of reducing unnecessary CSI reporting.

The programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments and can be modified as appropriate without departing from the spirit and scope of the present disclosure. Further, the present disclosure may be implemented by combining the above-described embodiments with one another.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

A base station comprising:

a transmission unit configured to transmit, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting; and a reception unit configured to receive the CSI reporting based on the first control information from the communication terminal which has responded to the instruction to perform the CSI reporting among the at least one communication terminal(s).

(Supplementary Note 2)

The base station according to Supplementary note 1, wherein the first control information is trigger information for triggering the CSI reporting and includes a plurality of trigger information pieces to be candidates, the second control information is index information specifying one of the plurality of trigger information pieces, and the transmission unit makes each of the at least one communication terminal(s) respond to the instruction to perform the CSI reporting based on the trigger information piece specified by the index information.

(Supplementary Note 3)

The base station according to Supplementary note 2, wherein the trigger information is a CSI request, wherein when a value of the CSI request specified by the index information is a predetermined value, the transmission unit makes each of the at least one communication terminal(s) determine not to respond to the instruction to perform the CSI reporting, and wherein when the value of the CSI request specified by the index information is not the predetermined value, the transmission unit makes each of the at least one communication terminal(s) perform the CSI reporting based on the value of the CSI request.

(Supplementary Note 4)

The base station according to Supplementary note 1, wherein the first control information includes trigger information for triggering the CSI reporting, in which the triggering information is common to the at least one communication terminal(s), and configuration information of the CSI reporting associated with the trigger information, the second control information indicates whether the configuration information is activated, and the transmission unit makes each of the at least one communication terminal(s) determine whether to respond to the instruction to perform the CSI reporting based on the second control information.

(Supplementary Note 5)

The base station according to Supplementary note 4, wherein when the configuration information is deactivated, the transmission unit makes each of the at least one communication terminal(s) determine not to respond to the instruction to perform the CSI reporting, and wherein when the configuration information is activated, the transmission unit makes each of the at least one communication terminal(s) perform the CSI reporting based on the configuration information.

(Supplementary Note 6)

The base station according to Supplementary note 4 or 5, wherein the trigger information is a CSI request, and the second control information uses a MAC (Medium Access Control) control element.

(Supplementary Note 7)

The base station according to Supplementary note 1, wherein the first control information includes trigger information for triggering the CSI reporting, in which the triggering information is common to the at least one communication terminal(s), and identification information for identifying a reference RS (reference signal) associated with the trigger information, the second control information is a threshold used for determining whether to respond to the instruction to perform the CSI reporting, and the transmission unit makes each of the at least one communication terminal(s) determine whether to respond to the instruction to perform the CSI reporting based on history information of a measurement result of a reference RS (reference signal) identified by the identification information and the threshold.

(Supplementary Note 8)

The base station according to Supplementary note 7, wherein when the measurement result included in the history information is less than the threshold, the transmission unit makes each of the at least one communication terminal(s) determine not to respond to the instruction to perform the CSI reporting, and wherein when the measurement result included in the history information is not less than the threshold, the transmission unit makes each of the at least one communication terminal(s) perform the CSI reporting based on the trigger information.

(Supplementary Note 9)

The base station according to Supplementary note 7 or 8, wherein the trigger information is a CSI request, and the identification information is a Transmission Configuration Indication (TCI) included in trigger state information associated with the CSI request.

(Supplementary Note 10)

The base station according to any one of Supplementary notes 7 to 9, wherein the measurement result is RSRP (Reference Signal Received Power) of the reference RS.

(Supplementary Note 11)

The base station according to any one of Supplementary notes 2 to 10, wherein the transmission unit further transmits a common RNTI (Radio Network Temporary Identifier) to be referred to by the at least one communication terminal(s), and the trigger information is acquired by decoding a DCI (Downlink Control Information) format encoded by the common RNTI.

(Supplementary Note 12)

A communication terminal comprising:

a reception unit configured to receive, from a base station, first control information for instructing at least one communication terminal(s) including the communication terminal to perform CSI (Channel State Information) reporting and second control information for each of the at least one communication terminal(s) to determine whether to respond to the instruction to perform the CSI reporting;

a determination unit configured to determine whether to respond to the instruction to perform the CSI reporting based on the second control information; and a transmission unit configured to, when the determination unit determines to respond to the instruction to perform the CSI reporting, transmit the CSI reporting based on the first control information to the base station.

(Supplementary Note 13)

The communication terminal according to Supplementary note 12, wherein the first control information is trigger information for triggering the CSI reporting and includes a plurality of trigger information pieces to be candidates, the second control information is index information specifying one of the plurality of trigger information pieces, and the determination unit determines whether to respond to the instruction to perform the CSI reporting based on the trigger information piece specified by the index information.

(Supplementary Note 14)

The communication terminal according to Supplementary note 12, wherein the first control information includes trigger information for triggering the CSI reporting, in which the triggering information is common to the at least one communication terminal(s), and configuration information of the CSI reporting associated with the trigger information, the second control information indicates whether the configuration information is activated, and the determination unit determines whether to respond to the instruction to perform the CSI reporting based on the second control information.

(Supplementary Note 15)

The communication terminal according to Supplementary note 12, wherein the first control information includes trigger information for triggering the CSI reporting, in which the triggering information is common to the at least one communication terminal(s), and identification information for identifying a reference RS (reference signal) associated with the trigger information, the second control information is a threshold used for determining whether to respond to the instruction to perform the CSI reporting, and the determination unit determines whether to respond to the instruction to perform the CSI reporting based on history information of a measurement result of a reference RS (reference signal) identified by the identification information and the threshold.

(Supplementary Note 16)

A wireless communication method comprising transmitting, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting.

(Supplementary Note 17)

A wireless communication program for causing a computer to execute transmitting, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting.

(Supplementary Note 18)

A wireless communication system comprising:

a base station; and at least one communication terminal(s), wherein the base station comprises a transmission unit configured to transmit, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting, each of the at least one communication terminal(s) comprises:

a reception unit configured to receive the first control information and the second control information from the base station;

a determination unit configured to determine whether to respond to the instruction to perform the CSI reporting based on the second control information; and a transmission unit configured to transmit, when the determination unit determines to respond to the instruction to perform the CSI reporting, the CSI reporting based on the first control information to the base station.

(Supplementary Note 19)

The wireless communication system according to Supplementary note 18, wherein the first control information is trigger information for triggering the CSI reporting and includes a plurality of trigger information pieces to be candidates, the second control information is index information specifying one of the plurality of trigger information pieces, and the determination unit determines whether to respond to the instruction to perform the CSI reporting based on the trigger information piece specified by the index information.

(Supplementary Note 20)

The wireless communication system according to Supplementary note 18, wherein the first control information includes trigger information for triggering the CSI reporting, in which the triggering information is common to the at least one communication terminal(s), and configuration information of the CSI reporting associated with the trigger information, the second control information indicates whether the configuration information is activated, and the determination unit determines whether to respond to the instruction to perform the CSI reporting based on the second control information.

(Supplementary Note 21)

The wireless communication system according to Supplementary note 18, wherein the first control information includes trigger information for triggering the CSI reporting, in which the triggering information is common to the at least one communication terminal(s), and identification information for identifying a reference RS (reference signal) associated with the trigger information, the second control information is a threshold used for determining whether to respond to the instruction to perform the CSI reporting, and the determination unit determines whether to respond to the instruction to perform the CSI reporting based on history information of a measurement result of a reference RS (reference signal) identified by the identification information and the threshold.

What is claimed is:

1. A base station comprising:
   at least one memory storing instructions; and
   at least one processor configured to execute the instructions to:
   transmit, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting; and
   receive the CSI reporting based on the first control information from the communication terminal which has been determined to respond to the instruction to perform the CSI reporting,
   wherein the first control information includes trigger information for triggering the CSI reporting, in which the triggering information is common to the at least one communication terminal(s), and identification information for identifying a reference RS (reference signal) associated with the trigger information,
   wherein the second control information is a threshold used for determining whether to respond to the instruction to perform the CSI reporting, and
   wherein the at least one processor is configured to execute the instructions to make each of the at least one communication terminal(s) determine whether to respond to the instruction to perform the CSI reporting based on history information of a measurement result of a reference RS (reference signal) identified by the identification information, and the threshold.

2. The base station according to claim 1,
   wherein when the measurement result included in the history information is less than the threshold, the at least one processor is configured to execute the instructions to make each of the at least one communication terminal(s) determine not to respond to the instruction to perform the CSI reporting, and
   wherein when the measurement result included in the history information is not less than the threshold, the at least one processor is configured to execute the instructions to make each of the at least one communication terminal(s) perform the CSI reporting based on the trigger information.

3. The base station according to claim 1, wherein
   the trigger information is a CSI request, and
   the identification information is a TCI (Transmission Configuration Indication) included in trigger state information associated with the CSI request.

4. The base station according to claim 1, wherein the measurement result is RSRP (Reference Signal Received Power) of the reference RS.

5. The base station according to claim 1, wherein
   the at least one processor is further configured to execute the instructions to transmit a common RNTI (Radio Network Temporary Identifier) to be referred to by the at least one communication terminal(s), and
   the trigger information is acquired by decoding a DCI (Downlink Control Information) format encoded by the common RNTI.

6. A communication terminal comprising:
   at least one memory storing instructions; and
   at least one processor configured to execute the instructions to:
   receive, from a base station, first control information for instructing at least one communication terminal(s) including the communication terminal to perform CSI (Channel State Information) reporting and second control information for each of the at least one communication terminal(s) to determine whether to respond to the instruction to perform the CSI reporting;
   determine whether to respond to the instruction to perform the CSI reporting based on the second control information; and
   transmit the CSI reporting based on the first control information to the base station when the at least one processor determines to respond to the instruction to perform the CSI reporting,
   wherein the first control information includes trigger information for triggering the CSI reporting, in which the triggering information is common to the at least one communication terminal(s), and identification information for identifying a reference RS (reference signal) associated with the trigger information,
   wherein the second control information is a threshold used for determining whether to respond to the instruction to perform the CSI reporting, and wherein the at least one processor is configured to execute the instructions to determine whether to respond to the instruction to perform the CSI reporting based on history information of a measurement result of a reference RS (reference signal) identified by the identification information and the threshold.

7. A wireless communication method comprising transmitting, to at least one communication terminal(s), first control information for instructing the at least one communication terminal(s) to perform CSI (Channel State Information) reporting and second control information for making each of the at least one communication terminal(s) determine whether to respond to the instruction to perform the CSI reporting,
  wherein the first control information includes trigger information for triggering the CSI reporting, in which the triggering information is common to the at least one communication terminal(s), and identification information for identifying a reference RS (reference signal) associated with the trigger information,
  wherein the second control information is a threshold used for determining whether to respond to the instruction to perform the CSI reporting, and
  wherein the wireless communication method further comprises making each of the at least one communication terminal(s) determine whether to respond to the instruction to perform the CSI reporting based on history information of a measurement result of a reference RS (reference signal) identified by the identification information, and the threshold.

* * * * *